US008736545B2

(12) United States Patent
Sakamoto et al.

(10) Patent No.: US 8,736,545 B2
(45) Date of Patent: May 27, 2014

(54) IMAGE DISPLAY DEVICE AND DRIVING METHOD FOR THE SAME

(75) Inventors: Michiaki Sakamoto, Kanagawa (JP); Kenichi Takatori, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 358 days.

(21) Appl. No.: 12/838,319

(22) Filed: Jul. 16, 2010

(65) Prior Publication Data

US 2011/0012907 A1 Jan. 20, 2011

(30) Foreign Application Priority Data

Jul. 16, 2009 (JP) ................................ 2009-167725

(51) Int. Cl.
*G06T 9/00* (2006.01)

(52) U.S. Cl.
USPC ............ 345/107; 345/204; 345/690; 359/296

(58) Field of Classification Search
USPC ........................... 345/107, 204, 690; 359/296
See application file for complete search history.

(56) References Cited

U.S. PATENT DOCUMENTS

| | | | | |
|---|---|---|---|---|
| 2004/0217953 A1* | 11/2004 | Someya et al. | ............... | 345/204 |
| 2008/0165411 A1* | 7/2008 | Wang et al. | ................... | 359/296 |
| 2008/0231592 A1* | 9/2008 | Johnson et al. | ............... | 345/107 |
| 2009/0295710 A1* | 12/2009 | Shimodaira | .................. | 345/107 |

FOREIGN PATENT DOCUMENTS

| | | | |
|---|---|---|---|
| CN | 1809861 | A | 7/2006 |
| CN | 1875397 | A | 12/2006 |
| CN | 1910645 | A | 2/2007 |
| CN | 101203900 | A | 6/2008 |
| CN | 101290746 | A | 10/2008 |
| CN | 101290747 | A | 10/2008 |
| JP | 2001-166761 | A | 6/2001 |
| JP | 2004-133443 | A | 4/2004 |
| JP | 2005-173291 | A | 6/2005 |
| JP | 2005-242081 | A | 9/2005 |

(Continued)

OTHER PUBLICATIONS

Japanese Office Action issued Nov. 19, 2013 in corresponding Japanese Patent Application No. 2009-167725.

(Continued)

*Primary Examiner* — Alexander S Beck
*Assistant Examiner* — Jeffrey Steinberg
(74) *Attorney, Agent, or Firm* — Sughrue Mion, PLLC

(57) ABSTRACT

In an image display device including: an electrophoretic display element having a memory property and a display/update controlling unit which outputs the first control signal and the data signal to the data line driving circuit, and the second control signal to the scanning line driving circuit, based on given image data, during the image updating period of time, and cuts off power supply to the data line driving circuit and the scanning line driving circuit, during an image holding period of time, the display/update controlling unit, during the image updating period of time, inputs sequentially a plurality of pieces of compressed image block data having a data configuration which one screen of the image data is divided into a plurality of blocks, and compressed for each block, expands the compressed image block data of a preceding screen and the compressed image block data of a corresponding updating screen sequentially inputted, and outputs the data signal for screen update to the data line driving circuit, based on the expanded image block data of the preceding screen and the expanded image block data of the corresponding updating screen.

16 Claims, 14 Drawing Sheets

(56) References Cited

FOREIGN PATENT DOCUMENTS

| | | | | | |
|---|---|---|---|---|---|
| JP | 2005-316369 | A | | 11/2005 | |
| JP | 2007-010970 | A | | 1/2007 | |
| JP | 2007-041394 | A | | 2/2007 | |
| JP | 2007-510944 | A | | 4/2007 | |
| JP | 2007-249230 | A | | 9/2007 | |
| JP | 2008203713 | A2 | * | 4/2008 | ............... G09G 5/00 |
| JP | 2008-257685 | A | | 10/2008 | |
| JP | 2008-542810 | A | | 11/2008 | |
| JP | 2009-110001 | A | | 5/2009 | |
| WO | WO 2005043504 | A1 | * | 5/2005 | |

OTHER PUBLICATIONS

Chinese Office Action issued in corresponding Chinese Patent Application No. 201010265448.8.

* cited by examiner

| Updating Image Data (N) \ Preceding Image Data (C) | B | W |
|---|---|---|
| B | WF11 | WF12 |
| W | WF21 | WF22 |

WF11, WF12, WF21, WF22 =“00” or “10” or “01”

FIG.8

| | Embodiment | Related Art |
|---|---|---|
| Memory Size | ★Working Region<br>Compression JPEG 2 Screens +LUT etc.<br>1600×1200×8×2×(1/5) bit + 1Mbit = 7Mbit<br>★Graphic Memory (number of sub-block 1/5)<br>1600×1200×8×(1/5) bit = 3Mbit<br>★Total 7Mbit + 3Mbit~10Mbit | 2 Screen + LUT etc.<br>1600×1200×8×2 bit + 1Mbit = 31Mbit |
| Low Dissipation Power | ★During Time of Image Updating<br>Controller 150mW<br>Memory 100mW<br>Radio Transmit /Receive Unit 0mW<br>Display Power Supply 50mW<br><Total> 300mW<br>★During Time of Image Holding<br>Controller, Memory, Display Power Supply 0mW<br>Radio Transmit /Receive Unit (sleep)5mW(wake)50mW | ★During Time of Image Updating<br>Controller 150mW<br>Memory 310mW<br>Radio Transmit /Receive Unit 0mW<br>Display Power Supply 50mW<br><Total> 510mW<br>★During Time of Image Holding<br>Controller, Display Power Supply 0mW<br>Memory 0mW<br>Radio Transmit /Receive Unit (sleep)5mW(wake)50mW |

IMAGE DISPLAY DEVICE AND DRIVING METHOD FOR THE SAME

INCORPORATION BY REFERENCE

This application is based upon and claims the benefit of priorities from Japanese Patent Application No. 2009-167725, filed on Jul. 16, 2009, the disclosures of which are incorporated herein in its entirely by reference.

BACKGROUND OF THE INVENTION

1. Field of the Invention

The present invention relates to an image display device and a driving method for the same, and more specifically to the image display device and the driving method employed in the same that are well suited for applications, for example, in a case where a display having a memory property such as electronic paper is used.

2. Description of the Related Art

Recently, a content display device replacing paper has been needed socially as a medium for displaying content. This type of content display device may come in a browser terminal having an A5 (148 mm×210 mm) size to A4 (210 mm×297 mm) size display screen capable of browsing news updated as needed, for example, the most recent newspaper contents delivered automatically from a server or a large-scale advertizing billboard having a display screen of an A2 (420 mm×594 mm) size to A1 (594 mm×841 mm) size or larger which may be put up at a station. The content display devices give and receive contents in condition where they are wirelessly connected with the server and also are needed to operate on low dissipation power with less loads on environments in a condition where it is supplied with power from a secondary battery or a solar battery.

In such a case, the content display device should preferably be made up of, for example, a high-definition display with a relatively large screen, which has a memory property, a radio transmit/receive unit, and a low-dissipation power display circuit such as a control unit having a smaller number of components. For example, a book viewer Kindle (registered trademark) from Amazon Inc. has A6 (105 mm×148 mm) size electronic paper with a resolution of a SVGA (super video graphics array; 800 by 600 matrix of pixels) using micro-capsule type electrophoretic display elements from the American E Ink Company and so has a function to wirelessly connect to a contents server via the internet so that books, blogs, newspapers, and magazines can be directly downloaded online not by way of a personal computer.

FIG. 14 is an outlined cross-sectional view for showing the configuration of the micro-capsule type electrophoretic display element used in the related-art type of content display device.

As shown in FIG. 14, the electrophoretic display element is made of a stack including a thin film transistor (TFT) glass substrate 1, an electrophoretic element film 2, and a facing substrate 3. The TFT glass substrate 1 has a switching element TFT 4 and a pixel electrode 5 connected to the TFT 4. The electrophoretic element film 2 has a polymer binder filled with micro-capsules 6 having an about 40 μm size. The micro-capsule 6 has a solvent injected therein, in which solvent negatively-charged white pigments and positively-charged black pigments having a scale of nanometers are suspended in countless numbers. The facing substrate 3 has a facing electrode 7 formed thereon for giving a reference potential.

In the display device using this type of electrophoretic display element, a voltage that corresponds to image data is applied between the pixel electrode 5 and the facing electrode 7, causing the white pigments and the black pigments to move up and down. For example, supposing the side of the facing electrode 7 to be a display surface, if the pixel electrode 5 is supplied with a positive voltage, the negatively-charged white pigments get close to the pixel electrode 5 so that the display surface may appear black, while on the other hand, if the pixel electrode 5 is supplied with a negative voltage, the positively-charged black pigments get close to the pixel electrode 5 so that the display surface may appear white. Further, since the electrophoretic display elements have memory functions, when switching the pixel data of an image from white to black, a negative voltage is applied, whereas when switching the pixel data of the image from black to white, a positive voltage is applied; and when displaying white after white or black after black, a voltage of 0V is applied. That is, in driving this display device, the voltage of a signal which is applied to the electrophoretic display element is determined on the basis of comparison between the preceding screen and the next screen.

Further, typically, an active matrix display device such as a liquid crystal display (LCD) employs a lapse of time of 1/60 second (=16.6 ms) as one frame so that an entirety of an image may be switched in the one frame. On the other hand, a display device using an electrophoretic display element cannot switch the screen unless a voltage is applied over a period of a plurality of the frames because the electrophoretic display element has a low response speed and, therefore, employs a driving method of pulse width modulation (PWM), by which a constant voltage will be applied in a period of a plurality of the frames. In the case of the present display device in which micro-capsule type electrophoretic display elements are used, since such electrophoretic display elements have a memory property, when updating the screen, a history of the preceding screen needs to be erased. Therefore, either one of two driving methods is employed: one driving method (hereinafter referred to as "reset driving method") of displaying an updating screen after erasing the entire screen by switching this to white, black, and white in this order on a reset screen or the other driving method (hereinafter referred to as "preceding screen referencing/driving method") of determining a voltage to be applied to pixels by referencing a look-up table (LUT) based on pixel data of the preceding screen and that of the next screen. The preceding screen referencing/driving method need not use a reset screen and so is excellent in display performance but requires a graphic memory for storing the preceding screen and the updating screen and so has a problem in that a residual image of the preceding screen will appear unless the LUT is set properly. Further, it has another problem of an increased scale of the graphic memory and peripheral circuitry as well as increased dissipation power and a complicated hardware architecture.

Besides the driving methods for the above-mentioned display devices, this type of related art may include a driving method for a bistable electro-optic display described in Japanese Patent Application Publication No. 2007-249230 (hereinafter, referred to as Related Art Patent Document 1), for example.

In driving, this display stores data of a plurality of images in a data storage unit and also stores a preceding screen and an updating screen in a graphic memory made up of a static random access memory (SRAM) so that those two screens may be compared to each other. Therefore, the graphic memory needs to have a capacity for storing at least two screens: the updating screen and the preceding screen. The capacity of this graphic memory is of no problem in the case of a relatively small display size; however, in the case of large-size display, for example, monochromatic A4-size display in an ultra extended graphics array (UXGA) with 1600 by 1200 (pixels), this graphic memory needs to have a capacity of 30.8 Mbits (=1600×1200×8×2 (screens)), assuming that one pixel requires eight bits of data. Further, in the case of A2-size advertizing display in a quad ultra extended graphics array (QUXGA) with 3200 by 2400 (pixels), this graphic memory needs to have a capacity of 123.3 Mbits (=3200×2400×8×2 (screens)).

Further, in an electrophoretic display having compressed memory data described in Japanese Patent Application Publication No. 2007-510944 (hereinafter, referred to as Related Art Patent Document 2), the data of screens to be input to the graphic memory is compressed and stored in it, so that at the time of comparison for updating of the next screen, the compressed image data of a preceding screen is expanded in real time to create data to be compared to an image data stream of the next screen, thereby calculating a signal to be applied to the electrophoretic display based on a LUT. In this case, during a lapse of time when the image is held, the data of the preceding screen is compressed and saved, so that while this image is being held, it is necessary only to supply power to a memory that holds the data, thereby reducing dissipation power during image holding.

Further, in a display device described in Japanese Patent Application Publication No. 2005-242081 (hereinafter, referred to as Related Art Patent Document 3), a buffer for graphics will be dynamically allocated in a memory region, thereby effectively utilizing the capacity of a memory including the graphic memory. That is, if expansion/transfer of a display image starts, a memory region for expanding one screen ready for display is acquired from the RAM, so that when an object for the one screen is expanded, a display panel unit is supplied with power so that the display image may be updated. When the display image is updated completely, power supply to the display unit is cut off, thereby reducing dissipation power and also releasing the expansion memory.

It is considered that this example has employed the reset driving method of displaying an updating screen after erasing the history of the preceding screen from the display on a reset screen by switching the screen to white, black, and white in this order so that the residual image of the preceding screen may not be left, because the memory region for graphics is dynamically acquired and so the data of the preceding screen is not held. Therefore, a display controller is simplified.

Further, in an image display system described in Japanese Patent Application Publication No. 2001-166761 (hereinafter, referred to as Related Art Patent Document 4), if the side of a host that executes an application requests the side of a panel to display an image, data of the image before this image is expanded is transferred to the panel side. The panel side, which is equipped with a panel memory for image expansion, expands the image in the panel memory based on the image data transferred from the host side and also displays the image expanded into this panel memory in the panel.

Further, in an image display device described in Japanese Patent Application Publication No. 2007-010970 (hereinafter, referred to as Related Art Patent Document 5), an image is displayed on a display device including liquid crystal having a memory property; if a command is given to change an image being displayed on this display, a central processing unit (CPU) determines an update region in which at least part of the image on the display is to be updated, based on the currently displayed image and a post-change image. Then, a graphics processing unit (GPU) rewrites the display only in the region determined as the update region by the CPU.

However, the above-mentioned related arts have the following problems. That is, the bistable electro-optic display described in the Related Art Patent Document 1 has a problem in that since it is necessary to supply the graphic memory with data of two screens, that is, the preceding screen and the updating screen when updating an image, this graphic memory may be bloated to increase dissipation power and manufacturing costs. Further, although it is unnecessary to supply power to display unit having a memory property when an image is being held, since image data of the preceding screen is stored in the graphic memory when updating this image, in order to continue to hold a history of the preceding screen, it is necessary to continue supplying power to the graphic memory even during image holding other than image updating, so that a driving circuit dissipates power even during image holding, making it difficult to reduce dissipation power.

Further, the electrophoretic display described in the Related Art Patent Document 2 alleviates the problem of the Related Art Patent Document 1, that is, power will be dissipated by the driving circuit during image holding; however, when updating an image, it is necessary to expand data of the preceding screen and also add a memory and a circuit for holding the data of the updating screen expanded. Accordingly, the graphic memory itself is not downsized, making it difficult to reduce dissipation power, in particular, at the time of image updating.

In the case of the display device described in the Related Art Patent Document 3, although the display controller is simplified, it is necessary to insert a reset screen (for switching display to white, black, and white in this order) between a point in time for displaying the preceding screen and a point in time for displaying an updating screen; therefore, when displaying character data pieces continually, a problem occurs in response speed lowering and screen flickering, so that this type of display device is not suitable as a content display device. Further, for example, it is necessary to acquire memory dynamically, which leads to the necessity of an OS function such as memory management and also the necessity of securing a storage large enough to accommodate the memory dynamically, giving rise to a problem in an increase in manufacturing cost. Further, when updating an image, a graphic memory region having a size of one frame of image data is acquired, giving rise to a problem in that the necessary memory size or dissipation power will not be reduced.

The image display system described in the Related Art Patent Document 4 employs a concept different from that of the present invention, although processing pieces are dispersed between the host side and the panel side so that workloads of an entirety of the system may be optimized.

The image display device described in the Related Art Patent Document 5 employs a concept different from that of the present invention, although an image will be rewritten more speedily on a display including liquid crystal with memory without damaging a constant image quality.

SUMMARY OF THE INVENTION

In view of the above, it is an object of the present invention to provide an image display device that has a display with memory such as electronic paper and can operate by using a secondary battery or a solar battery on low dissipation power not only at the time of image holding but also at the time of image updating and a driving method employed in this image display device.

According to a first aspect of the present invention, there is provided an image display device having a memory property including:

a display section having a plurality of data lines extending in parallel to one another along a first direction, a plurality of scanning lines extending in parallel to one another along a second direction, and a plurality of pixels which are each positioned at an intersection of each of the data lines and each of the scanning lines, the pixels each including an electrophoretic display element having a memory property;

a data line driving circuit that writes pixel data to each of the data lines based on a given first control signal and a given data signal;

a scanning line driving circuit that outputs a scanning line driving signal for driving the scanning lines in predetermined order, based on a given second control signal; and a display/update controlling unit to output the first control signal and the data signal to the data line driving circuit, and the second control signal to the scanning line driving circuit, based on given image data, during the image updating period of time, and to cut off power supply to the data line driving circuit and the scanning line driving circuit, during an image holding period of time, wherein the display/update controlling unit, during the image updating period of time, inputs sequentially a plurality of pieces of compressed image block data having a data configuration which one screen of the image data is divided into a plurality of blocks, and compressed for each block, expands the compressed image block data of a preceding screen and the compressed image block data of a corresponding updating screen sequentially inputted, and outputs the data signal for screen update to the data line driving circuit, based on the expanded image block data of the preceding screen and the expanded image block data of the corresponding updating screen.

According to a second aspect of the present invention, there is provided a driving method for driving an image display device having a memory property, the image display device including: a display section having a plurality of data lines extending in parallel to one another along a first direction, a plurality of scanning lines extending in parallel to one another along a second direction, and a plurality of pixels which are each positioned at an intersection of each of the data lines and each of the scanning lines, the pixels each including an electrophoretic display element having a memory property; a data line driving circuit that writes pixel data to each of the data lines based on a given first control signal and a given data signal; a scanning line driving circuit that outputs a scanning line driving signal for driving the scanning lines in predetermined order, based on a given second control signal; and a display/update controlling unit to output the first control signal and the data signal to the data line driving circuit, and the second control signal to the scanning line driving circuit, based on given image data, during the image updating period of time, and to cut off power supply to the data line driving circuit and the scanning line driving circuit, during an image holding period of time, the driving method including:

a display/update processing in which the display/update controlling unit, during the image updating period of time, inputs sequentially a plurality of pieces of compressed image block data having a data configuration which one screen of the image data is divided into a plurality of blocks, and compressed for each block, expands the compressed image block data of a preceding screen and the compressed image block data of a corresponding updating screen sequentially inputted, and outputs the data signal for screen update to the data line driving circuit, based on the expanded image block data of the preceding screen and the expanded image block data of the corresponding updating screen.

With the above configurations, it is possible to realize an image display device that dissipates less power and has fewer components.

BRIEF DESCRIPTION OF THE DRAWINGS

FIG. 8 is a table for explaining dissipation power of the image display device;

DESCRIPTION OF THE PREFERRED EMBODIMENTS

Figure 1:
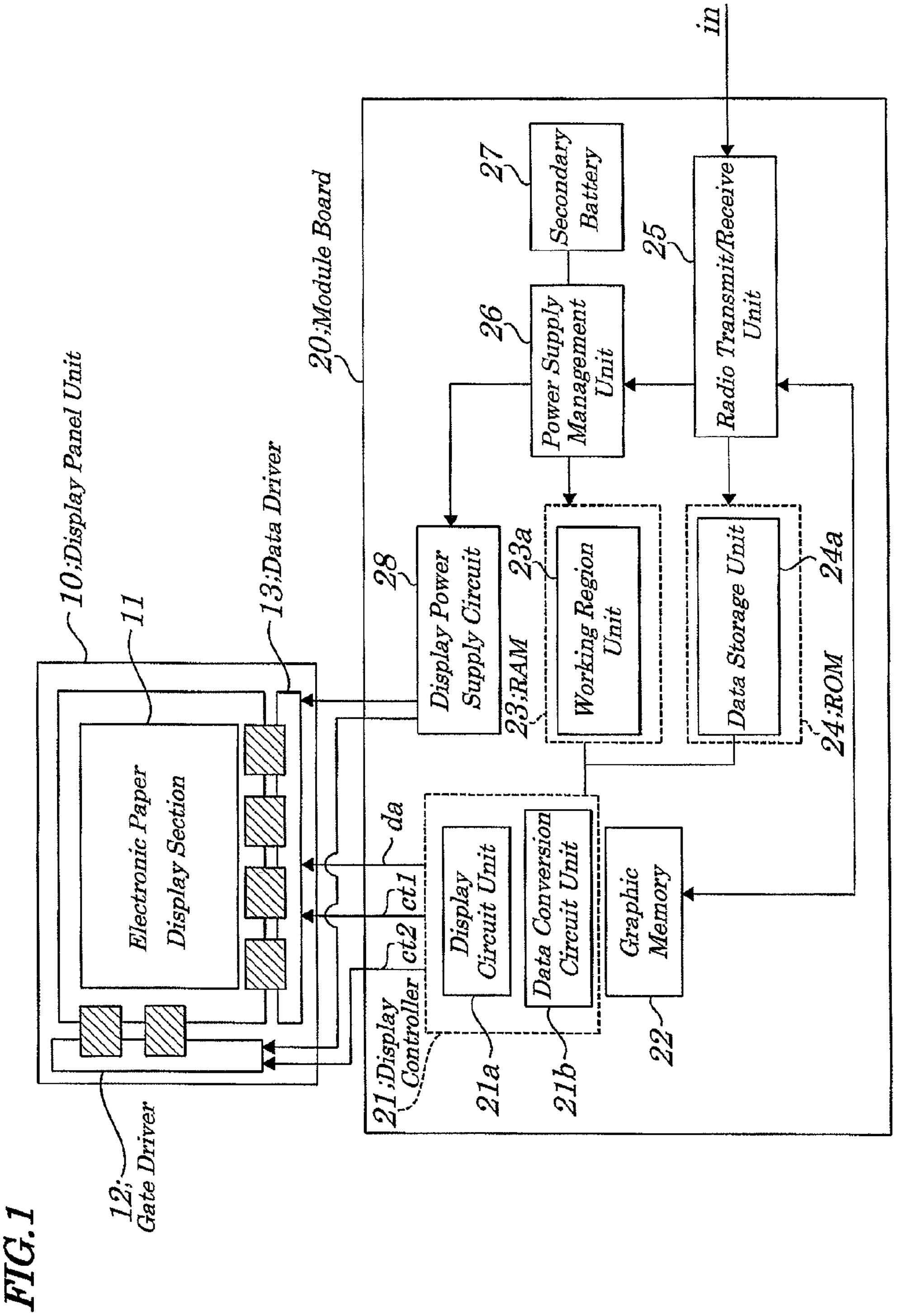
FIG. 1 is a block diagram for showing schematically electrical configurations of main portions of an image display device according to a first exemplary embodiment of the present invention.

Best modes of carrying out the present invention will be described in further detail using various exemplary embodiments with reference to accompanying drawings.

A preferable mode is one wherein the display/update controlling unit includes: a receiving unit to receive sequentially the plurality of pieces of the compressed image block data; a data storage unit to store the sequentially received compressed image block data; a data conversion circuit unit to expand the compressed image block data of the preceding screen and the compressed image block data of the corresponding updating screen sequentially received; a graphic memory to store the expanded image block data of the preceding screen and the expanded image block data of the corresponding updating screen; and a display circuit unit to output the data signal for screen update to the data line driving circuit, based on the expanded image block data of the preceding screen and the expanded image block data of the corresponding updating screen.

Also, a preferable mode is one wherein the graphic memory has a capacity size capable of storing a single piece of the expanded image block data of the preceding screen and a single piece of the expanded image block data of the corresponding updating screen.

Moreover, a preferable mode is one wherein that includes a plurality of uni-display sections having a form of one screen of a multi-display as a whole, and each having a plurality of data lines extending in parallel to one another along a first direction, a plurality of scanning lines extending in parallel to one another along a second direction, and a plurality of pixels which are each positioned at an intersection of each of the data lines and each of the scanning lines, the pixels each including an electrophoretic display element having a memory property; a plurality of data line driving circuits, provided for each uni-display section, that each write pixel data to each of the data lines based on a given first control signal and a given data signal; a plurality of scanning line driving circuits, provided for each uni-display section, that each output a scanning line driving signal for driving the scanning lines in predetermined order, based on a given second control signal; and a display/update controlling unit to supply power to the data line driving circuits and the scanning line driving circuits, during an image updating period of time, and to cut off power supply to the data line driving circuits and the scanning line driving circuits, during an image holding period of time, the display/update controlling unit outputting the first control signal and the data signal to the data line driving circuits, and the second control signal to the scanning line driving circuits, based on given image data, during the image updating period of time, wherein the display/update controlling unit inputs sequentially a plurality of pieces of compressed image block data having a data configuration which one screen of the image data for the multi-display is divided into a plurality of blocks, and compressed for each block, expands the compressed image block data of a preceding screen and the compressed image block data of a corresponding updating screen sequentially inputted, and outputs the data signal for screen update to the data line driving circuits, based on the expanded image block data of the preceding screen and the expanded image block data of the corresponding updating screen.

Further, a preferable mode is one wherein the graphic memory has a capacity size capable of storing a single piece of the expanded image block data of the preceding screen and a single piece of the expanded image block data of the corresponding updating screen on the corresponding uni-display section.

Still further, a preferable mode is one wherein a header for designating a target display sections is attached to the expanded image block data; and wherein the display/update controlling unit outputs the first control signal and the data signal to the corresponding data line driving circuit, and the second control signal to the corresponding scanning line driving circuit, based on the attached header.

First Exemplary Embodiment

FIG. 1 is a block diagram for showing schematically electrical configurations of main portions of an image display device according to a first exemplary embodiment of the present invention.

Figure 14:
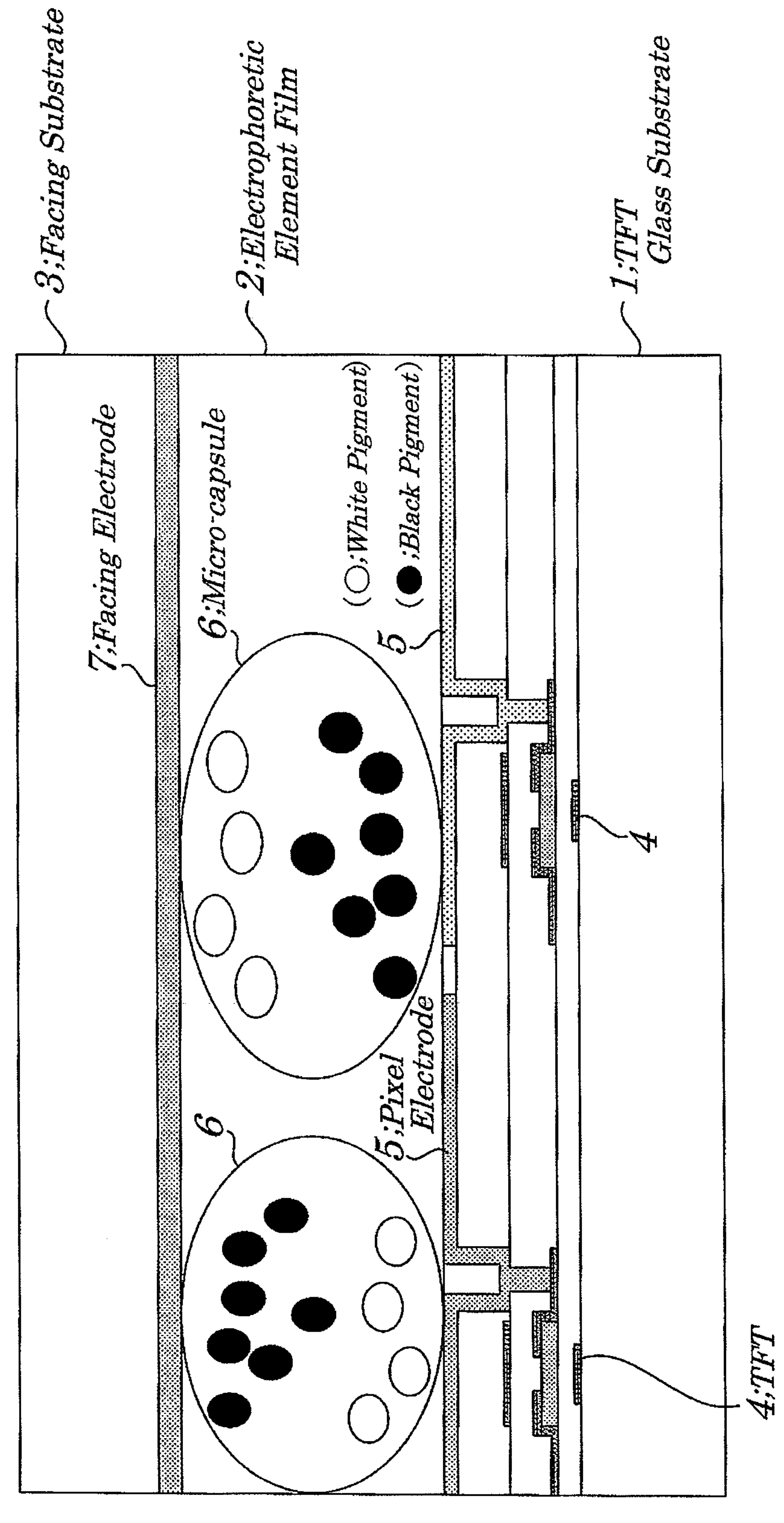
FIG. 14 (RELATED ART)
FIG. 14 is an outlined cross-sectional view for showing a configuration of a micro-capsule type electrophoretic display element.

As shown in FIG. 1, the image display device of the first exemplary embodiment includes a display panel unit 10 and a module board 20. The display panel unit 10 includes an electronic paper display section 11, a gate driver 12, and a data driver 13. The electronic paper display section 11 has memory and includes, although not shown, data lines along predetermined columns, scanning lines along predetermined rows, and pixels which are each positioned at an intersection of each of the data lines and each of the scanning lines, the pixels each including an electrophoretic display element. In this case, the electronic paper display section 11 is an A4-size display device including micro-capsule type electrophoretic display elements and having a resolution of, for example, an ultra extended graphics array (UXGA) with 1600 by 1200 (pixels) and is made up of a TFT glass substrate, an electrophoretic element film, and a facing substrate in a stacked configuration (FIG. 14).

The data driver 13 writes pixel data based on a data signal "da" supplied from the module board 20 to each of the data lines based on a control signal "ct1" (first control signal) supplied from this module board 20. In particular, in the present invention, the data driver 13 may come in a ternary driver capable of outputting three values of +15V, 0V, and −15V in response to two values of data applied thereto. The gate driver 12 outputs a scanning line driving signal intended to drive the scanning lines in predetermined order (for example, line sequence), based on a control signal "ct2" (second control signal) supplied from the module board 20.

During an image updating period of time, the module board 20 outputs the control signal "ct1" and the corresponding data signal "da" to the data driver 13, and also outputs the control signal "ct2" to the gate driver 12, based on image data supplied from a server and a like (not shown). In particular, in the first exemplary embodiment, the module board 20 includes a display controller 21, a graphic memory 22, a RAM 23, a ROM 24, a radio transmit/receive unit 25, a power supply management unit 26, a secondary battery 27, and a display power supply circuit 28. The radio transmit/receive unit 25 receives image block data having a data configuration which one screen of the image data is divided into a plurality of blocks, and compressed for each block. In particular, in the first exemplary embodiment, the radio transmit/receive unit 25 may be configured by combining necessary elements selected from those in accordance with the Bluetooth, ultra wideband (UWB), and radio local area network (LAN) standards, thereby receiving an image block data group, image information data, look-up table (LUT) data, and alike.

The ROM 24, which may be, for example, a nonvolatile flash ROM, has a data storage unit 24*a*. The data storage unit 24*a* stores a plurality of screens of image block data received by the radio transmit/receive unit 25. It is to be noted that the data storage unit 24*a* may be made up of, for example, a volatile RAM. The RAM 23 has a working region unit 23*a*. The working region unit 23*a* is used to read data required when displaying a screen and made up of a mobile RAM, which is higher in speed than a flash ROM. The data required at the time of screen display includes preceding screen data, updating screen data, and screen information data. The screen information data includes an address information table of image blocks, a preceding screen number, updating screen number, and a LUT group used in screen display as well as panel parameters.

The display controller 21 has a display circuit unit 21*a* and a data conversion circuit unit 21*b*. The display circuit unit 21*a* is arranged to expand image block data of a preceding screen and that of the corresponding updating screen. In particular, in the first exemplary embodiment, when updating a screen, the data conversion circuit unit 21*b* converts data (C) of the preceding screen and image data (N) to be updated in such a manner that one piece of pixel data may be transformed into eight-bit "C:N data" which combines the four bits of pixel data of the preceding screen and the four bits of pixel data of the updating screen, thereby enabling high-speed LUT conversion in the display circuit unit 21*a*.

The graphic memory 22 stores image block data expanded into the data conversion circuit unit 21*b*. Based on the image block data stored in the graphic memory 22, the display circuit unit 21*a* outputs the control signals ""ct1"" and "ct2" as well as the data signal "da". In this case, the display circuit unit 21*a* performs LUT conversion by reading C:N data from the graphic memory 22, thereby outputting the control signals ""ct1"" and "ct2" as well as the data signal "da". The graphic memory 22 has a capacity (for example, capacity for accommodating about several hundreds of line buffers of the panel) capable of storing only some of the preceding screen data pieces and the updating screen data pieces and is used as a memory when the data conversion circuit unit 21*b* and the display circuit unit 21*a* perform calculations.

The secondary battery 27 generates power used to operate an entirety of the image display device. The display power supply circuit 28 supplies power to the gate driver (scanning line driving circuit) 12, the data driver (data line driving circuit) 13 or a like under the control of the power supply management unit 26. The power supply management unit 26 supplies power to the corresponding units (components) during the image updating period of time, and cuts off power supply to the corresponding units (components) during an image holding period of time based on the image data "in" received by the radio transmit/receive unit 25.

Figure 2:
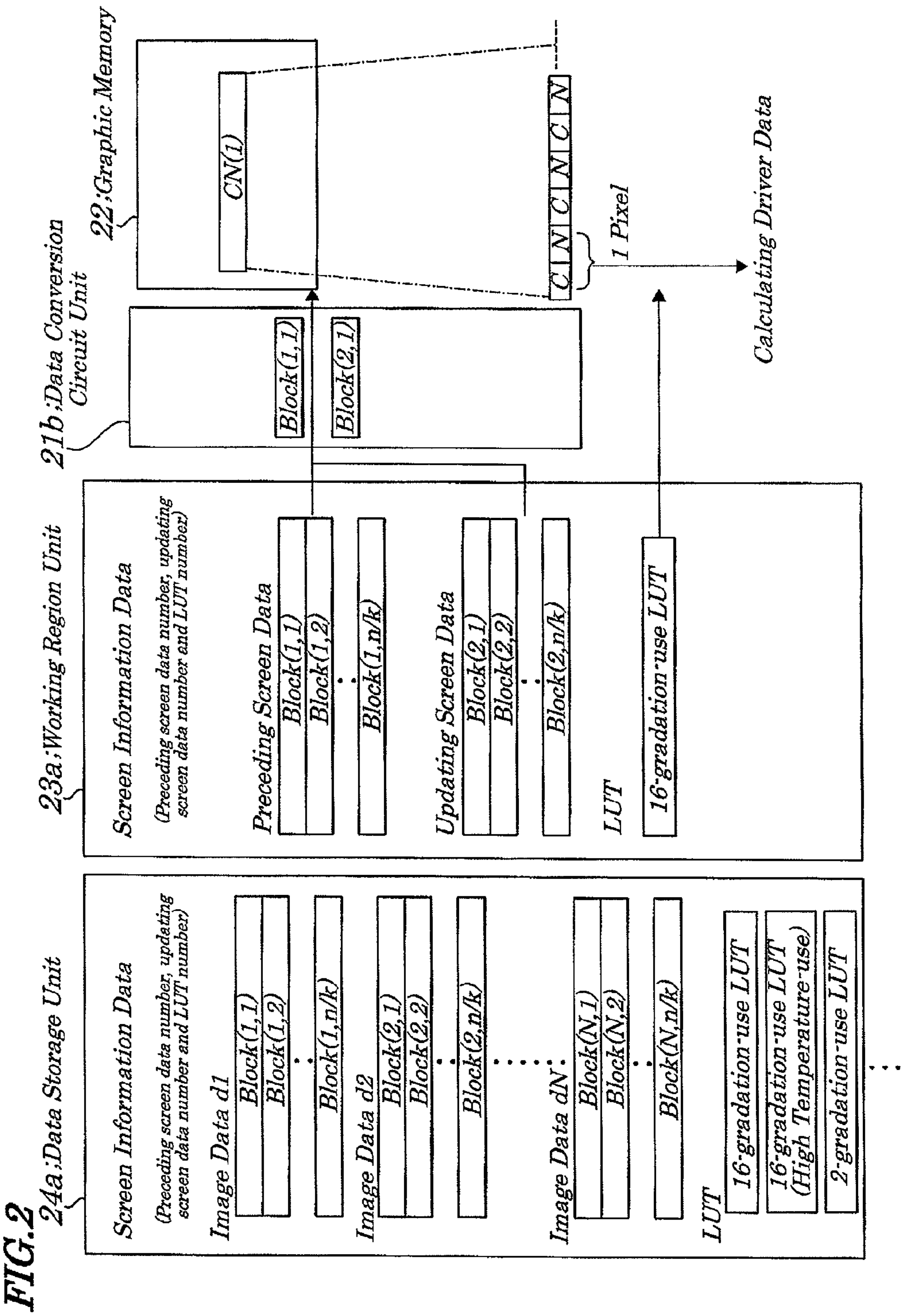
FIG. 2 is a diagram for explaining a format and processing of data which is expanded into a data storage unit, a working region unit, a data conversion circuit unit, and a graphic memory, which make up the same image display device as shown in FIG. 1.

FIG. 2 is a diagram for explaining a format and processing of data which is expanded into the data storage unit 24*a*, the working region unit 23*a*, the data conversion circuit unit 21*b*, and the graphic memory 22 shown in FIG. 1.

As shown in FIG. 2, screen information data is stored in the data storage unit 24*a*. The screen information data is made up of a preceding screen data number, an updating screen data number, and a LUT number. That is, image data to be displayed is stored in the data storage unit 24*a*. The image data pieces are fitted with image numbers. (image data pieces d1, d2, . . . , and dN) in order in which they are to be displayed. Further, one screen of image data has a data configuration which one screen of the image data is divided into a plurality of blocks, and compressed for each block. The plurality of blocks each respectively correspond to a single or a plurality of lines on the panel screen.

For example, in the case of the N-th display data piece that corresponds to a UXGA panel having a form of a matrix array with m rows and n columns (m=1600, n=1200), assuming that the image data is divided into blocks that respectively correspond to k pieces of lines, it is stored as divided into n/k number of image block data pieces BLOCKs (h, i) (h=1, 2, . . . , and N, i=1, 2, . . . , and n/k). It is to be noted that k is assumed to be a divisor of n. This assures that n/k be an integer. On the other hand, if n/k is not an integer because k is not a divisor of n, n/k can be replaced with an integer that is larger than n/k and the nearest thereto. The address information of those image block data pieces BLOCKS (h, i) is stored as the screen information data in a table format. Further, as other screen information data (not shown), such data pieces are stored as a display table which specifies display order of the screens, a LUT which covers a plurality of frames so that driving information may be specified, and panel setting parameters which specify the number of vertical and horizontal pixels in the panel as well as a blanking period. The LUTs stored may be any of, for example, a 16-gradation-use LUT, a 2-gradation-use LUT, a high temperature-use LUT used in a hot environments around the panel, and a like. Further, compressed data is created by dividing and compressing its original data on a personal computer (PC) at the server by using dedicated software. A format for compression used is, for example, a lossy compression format of the Joint Photographic Experts Group (JPEG), Wavelet, or fractal compression, which may be replaced with a lossless compression format of Huffman coding, run-length coding, Lempel-Ziv-Welch (LZW), and a like. Further, data may be compressed by combining the lossy compression format and the lossless compression format.

In the working region unit 23*a* are stored the screen information data, preceding image data, updating image data, and a LUT (for example, 16-gradation-use LUT) to be used which are transferred from the data storage unit 24*a*. In the data conversion circuit unit 21*b*, one block of block data of a preceding screen and block data of an updating screen which are transferred from the working region unit 23*a* are expanded and calculated, to combine one block of C:N data of CN (i) (i=1, 2, . . . , and n/k). For example, an image block data BLOCK (1, 1) of the preceding screen data and an image block data BLOCK (2, 1) of the updating screen data are transferred and combined into C:N data [CN(1)], which is then transferred to the graphic memory 22. In the graphic memory 22, one block of the C:N data [CN(1)] is stored. The graphic memory 22 acts as a temporary buffer which stores image information data blocks (C:N data) CN (i) (i is one of 1, 2, . . . , and n/k). For example, one pixel of C:N data stored in the graphic memory 22 is converted on the basis of a 16-gradation-use LUT for the working region unit 23*a*, to calculate driver data which is used to drive the electronic paper display section 11.

Figure 3:
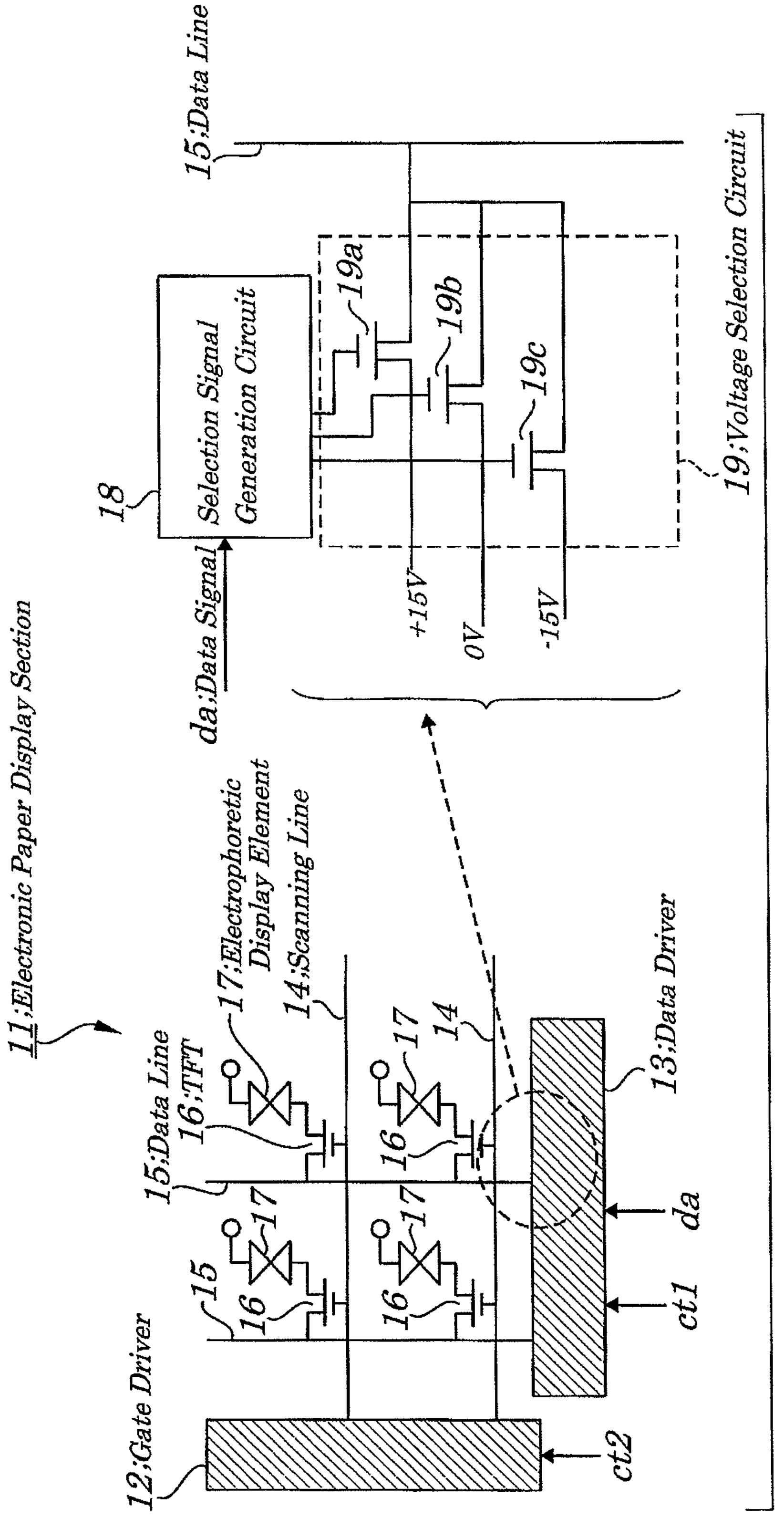
FIG. 3 is a diagram for schematically showing electrical configurations of an electronic paper display section and a data driver, which make up the same image display device as shown in FIG. 1.

FIG. 3 is a diagram for showing electrical configurations of the display panel unit 10 and the data driver 13 in FIG. 1.

As shown in this FIG. 3, the display panel unit 10 includes the electronic paper display section 11, the gate driver 12, and the data driver 13. The electronic paper display section 11 includes scanning lines 14, data lines 15, TFTs 16, and electrophoretic display elements 17. In the electronic paper display section 11, gate electrodes of the TFTs 16 are connected to the corresponding scanning lines 14 respectively, while source electrodes thereof are connected to the corresponding data lines 15 respectively. Further, to the drain electrodes of the TFTs 16, pixel electrodes (not shown) are connected respectively in such a manner that the pixel electrode and a facing electrode (not shown) sandwich the corresponding electrophoretic display element 17 placed therebetween.

On the other hand, the data driver 13 includes a selection signal generation circuit 18 and a voltage selection circuit 19. The voltage selection circuit 19 includes transistors 19*a*, 19*b*, and 19*c*. In the data driver 13, if the data signal "da" is "00" or "11", the transistor 19*b* is turned on to provide a driving voltage of 0V to the data line 15. Further, if the data signal "da" is "01", the transistor 19*a* is turned on to provide a driving voltage of +15V (black writing voltage) to the data line 15. Additionally, if the data signal "da" is "10", the transistor 19*c* is turned on to provide a driving voltage of −15V (white writing voltage) to the data line 15.

The electrophoretic display element 17 has memory and so needs to be supplied with a driving voltage of +15V when shifting from white (W) to black (B) and a driving voltage of −15V when shifting from black (B) to white (W); however, when holding white (W) as it is (W) or holding black (B) as it is (B), it is necessary only to refresh luminance of the preceding white (W) or black (B) color respectively. In this case, if the luminance is not refreshed, the white or black luminance deteriorates, so that the residual image of the preceding screen will be recognized on the electronic paper display section 11. Accordingly, for example, in the case of 2-gradation display, it is necessary to supply the data line 15 with a driving voltage having proper waveforms that correspond to the preceding screen data and the updating screen data.

FIGS. 4A, 4B, 5A, 5B, 6A and 6B each are a diagram for explaining the principle of a driving method for the electronic paper display section 11 in FIG. 3.

Figure 4A:
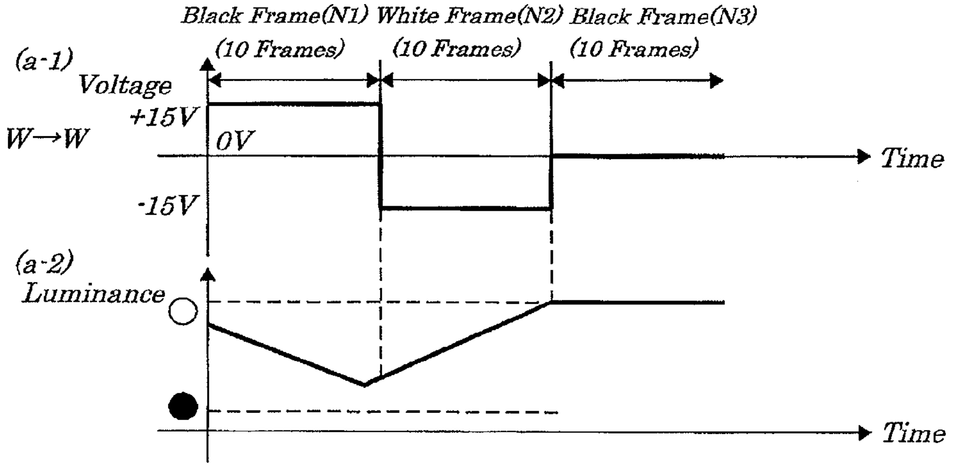
FIGS. 4A and 4B are diagrams for explaining a principle of a driving method for the electronic paper display section shown in FIG. 3.
Figure 4B:
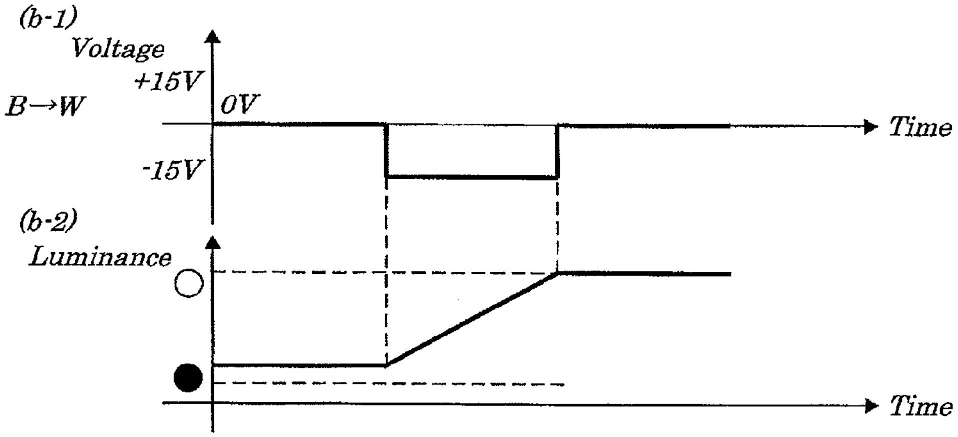

As shown in FIGS. 4A and 4B, in the electronic paper display section 11, the electrophoretic display element 17 is driven in, for example, 30 frames: first 10 frames as black frames (N1), the next 10 frames as white frames (N2), and the last 10 frames as black frames (N3). Graph (a-1) in FIG. 4A shows the waveforms of a driving voltage to be applied to the data line 15 if the preceding screen is white (W) and the updating screen is white (W), and graph (a-2) in FIG. 4A shows how the luminance of pixels changes correspondingly.

That is, in the first black frames (N1), a driving voltage of +15V for refreshing is applied to the data line 15 for 10 frames of a time lapse, to turn the screen black (B) once. In the next white frames (N2), a driving voltage of −15V is applied to the data line 15 for 10 frames of a time lapse, to refresh the screen to white (W). In the last black frames (N3), since the screen is already refreshed to white luminance, no driving voltage but 0V is applied to the data line 15. Even a pixel at which white (W) is held as it is (W) needs to refresh white luminance; because the white luminance of the preceding screen deteriorates during the image holding period of time, so that if it does not agree with white luminance of the pixel at the time when black (B) has been switched to white (W), such a residual image phenomenon that the preceding screen remains will occur. Further, the screen is once shifted to white (W), black (B), and white (W) in this order; because in a case where the DC voltage is not set to 0V when integrating an entirety of the driving waveforms with respect to time, if, for example, a pixel is repeatedly updated at white luminance, the unnecessary DC voltage continues to be applied, to charge up the electrophoretic display element 17. For example, if the pixel is repeatedly updated at white luminance, an unnecessary DC voltage continues to be applied, to charge up the electrophoretic display element 17, so that to prevent it, the DC voltage is reduced to 0V when integrating the entire driving waveforms with respect to time.

Next, graph (b-1) in FIG. 4B shows the waveforms of a driving voltage to be applied to the data line 15 if the preceding screen is black (B) and the updating screen is white (W). Graph (b-2) in FIG. 4B shows how the luminance of pixels changes correspondingly. That is, when the screen shifts from black (B) to white (W), in the black frames (N1, N3), no driving voltage is applied to the data line 15 and, instead, only in the white N2 frames, a driving voltage of −15V is applied for 10 frames of a time lapse so that the screen may shift from black (B) to white (W) in the N2 frames. In this case, in integration of the entire driving waveforms, the DC voltage is not canceled; because the DC components will be canceled automatically so that unnecessary DC voltages will not be applied continuously in the cases of the preceding black (B) screen, the updated white (W) screen, and the next updated black (B) screen in contrast to the case of white luminance updating, by arranging that subsequently the DC component of the driving waveform at the time of shift from white (W) to black (B) be offset with that of the driving waveform at the time of shift from black (B) to white (W) in graph (b-1) in FIG. 4B.

Figure 5A:
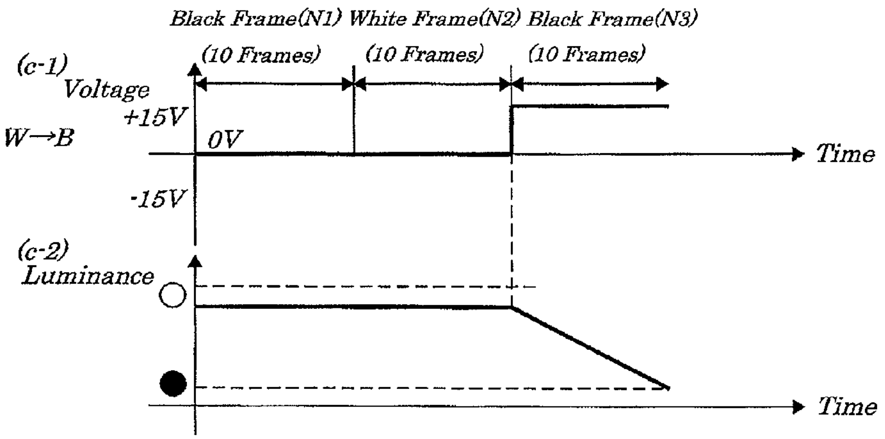
FIGS. 5A and 5B are further diagrams for explaining the principle of the driving method for the electronic paper display section shown in FIG. 3.
Figure 5B:
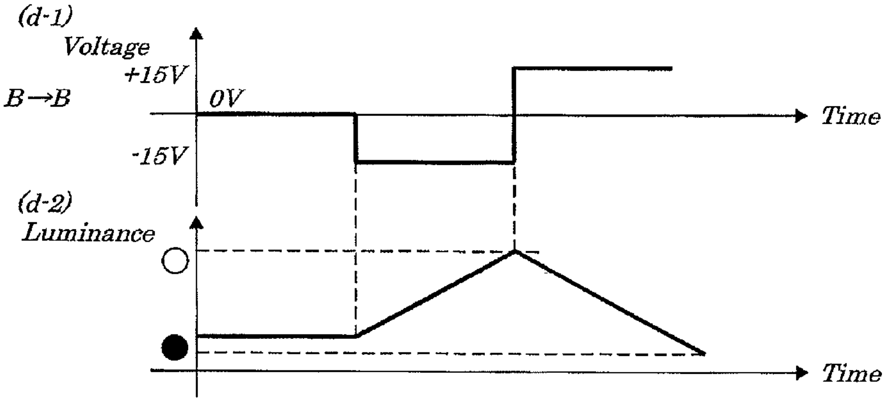

Further, graph (c-1) in FIG. 5A shows the waveforms of a driving voltage to be applied to the data line 15 if the preceding screen is white (W) and the updating screen is black (B) and graph (c-2) in FIG. 5A shows how the luminance of pixels changes correspondingly. Graph (d-1) in FIG. 5B shows the waveforms of a driving voltage to be applied to the data line 15 if the preceding screen is black (B) and the updating screen is black (B), and graph (d-2) in FIG. 5B shows how the luminance of pixels changes correspondingly.

Figures 6A, 6B:
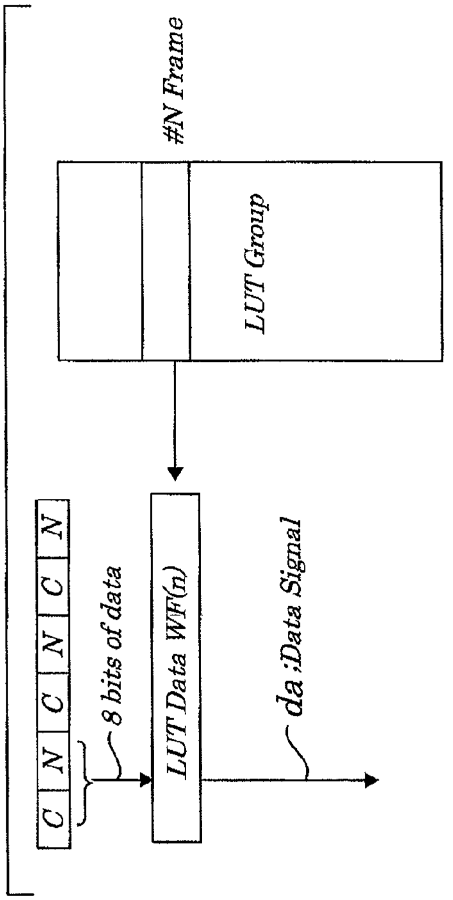
FIGS. 6A and 6B are still further diagrams for explaining the principle of the driving method for the electronic paper display section shown in FIG. 3.

To achieve the described driving method, for example, 128 frames of a LUT group WF(n) with an array of two rows and two columns such as shown in FIG. 6A is prepared. It is to be noted that the LUT group WF(n) refers to a LUT in the n-th frame, where “n” is any one of 0, 1, . . . , and 127, in the case of 128 frames.

FIG. 6A shows one look-up table WF(n), in which the row denotes the gradation data of the pixels in the updating screen and the column denotes that in the screen before being updated. Data pieces WF11, WF12, WF21, and WF22 at the respective intersections of those rows and columns give a data signal “da” of “00” (=0V), a data signal “da” of “10” (=−15V), or a data signal “da” of “01” (=+15V). In the first 10 black frames (N1), the n-th frame will have, for example, WF11(*n*) set to WF11 (0-9)=“00”, WF12 (0-9)=“00”, WF21 (0-9)=“00”, and WF22 (0-9)=“01” in the zero-th through ninth frames so that the pixel at which white (W) is held at it is (W) may be supplied with +15V as shown in graph (a-1) in FIG. 4A, the pixel at which black (B) is switched to white (W) may be supplied with 0V as shown in graph (b-1) in FIG. 4B, the pixel at which white (W) is switched to black (B) may be supplied with 0V as shown in graph (c-1) in FIG. 5A, and the pixel at which black (B) is held as it is (B) may be supplied with 0V as shown in graph (d-1) in FIG. 5B.

In the next 10 white frames (N2), the n-th frame will have, for example, WF11(*n*) set to WF11 (10-19)=“10”, WF12 (10-19)=“10”, WF21 (10-19)=“00”, and WF22 (10-19)=“10” so that the pixel at which white (W) is held at it is (W) may be supplied with −15V, the pixel at which black (B) is switched to white (W) may be supplied with −15V, the pixel at which white (W) may be switched to black (B) may be supplied with 0V, and the pixel at which black (B) is held as it is (B) may be supplied with −15V. In the last 10 black frames (N3), WF11 (20-29)=“00”, WF12 (20-29)=“00”, WF21 (20-29)=“01”, and WF22 (20-29)=“01” will be set so that the pixel at which white (W) is held at it is (W) may be supplied with 0V, the pixel at which black (B) is switched to white (W) may be supplied with 0V, the pixel at which white (W) may be switched to black (B) may be supplied with +15V, and the pixel at which black (B) is held as it is (B) may be supplied with +15V.

Further, as shown in FIG. 6B, driver data calculation means in the display circuit unit 21*a* calculates driver data (data signal “da”). That is, eight-bit data (in which C data and N data are combined) of CURRENT data (four bits)/NEXT data (four bits) created by combining the preceding screen pixel data and the updating screen pixel data which are extracted from the screen information data is converted into the data signal “da” by using WF(n), which is a LUT of the n-th frame read from the LUT group. For example, if the preceding screen is white and the next screen is white, WF11($n$) is read, if the preceding screen is white and the next screen is black, WF12($n$) is read, if the preceding screen is black and the next screen is white, WF21($n$) is read, and if the preceding screen is black and the next screen is black, WF22($n$) is read. The data driver 13 converts a value such as "00" in WF11($n$) into a voltage value. The operations are performed for each of the pixels in the screen for, for example, 30 frames of a time lapse. It is to be noted that although the above has been described with reference to the case of the 2-gradation screen, in the case of the 16-gradation screen, similar operations will be performed by expanding the LUT to a matrix having an array with 16 rows and 16 columns.

Figure 7:
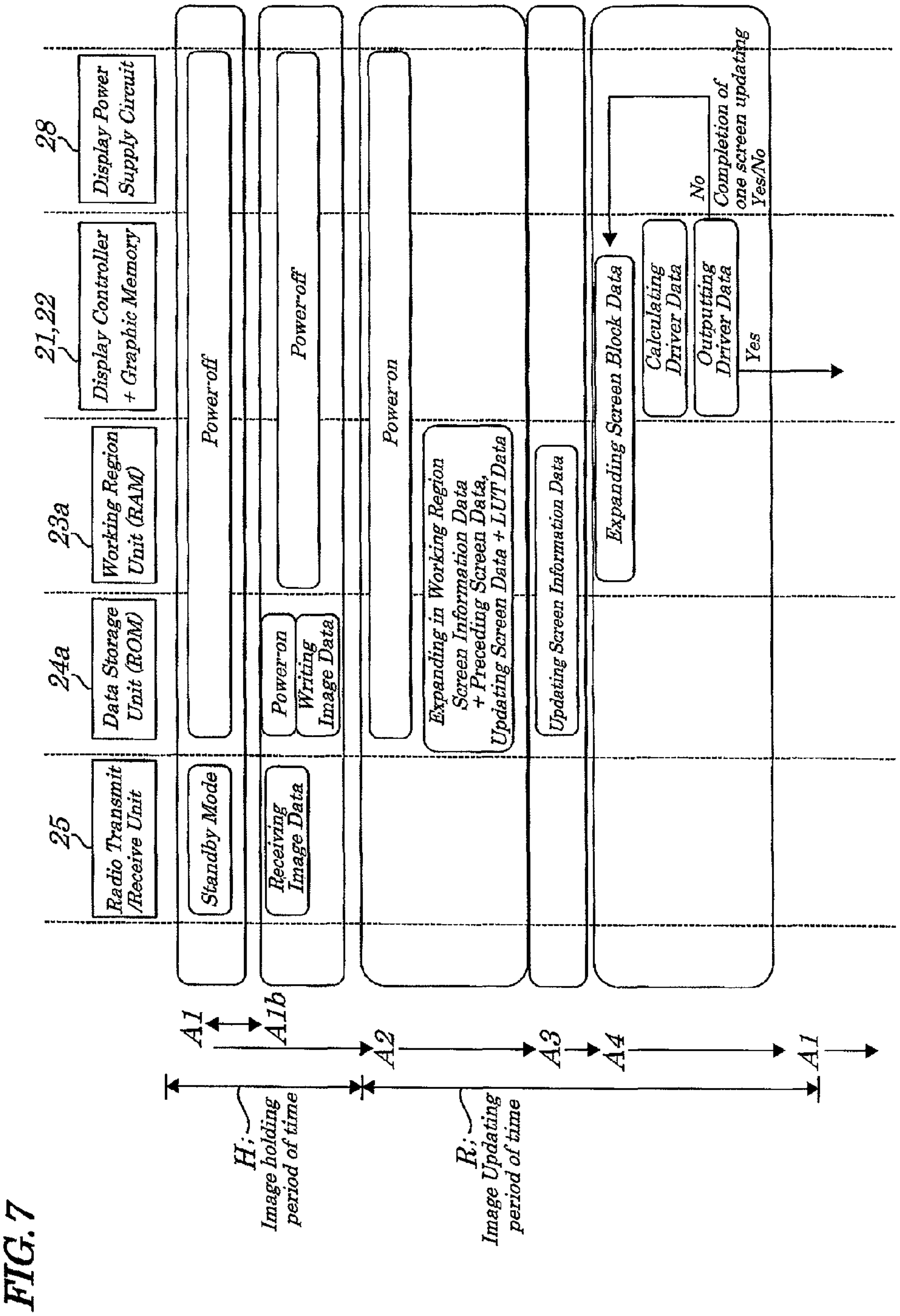
FIG. 7 is a sequence chart for explaining operations of the image display device shown in FIG. 1.

FIG. 7 is a sequence chart for explaining operations of the image display device in FIG. 1 and FIG. 8 is a table for explaining dissipation power of the image display device.

A description will be given of processing contents of a driving method used in the image display device of the first exemplary embodiment with reference to FIGS. 1, 7 and 8.

In the image display device, the module board 20 serves as a display/update controlling unit. On the module board 20, the display/update controlling unit inputs sequentially a plurality of pieces of compressed image block data having a data configuration which one screen of the image data is divided into a plurality of blocks, and compressed for each block, expands the compressed image block data of a preceding screen and the compressed image block data of a corresponding updating screen sequentially inputted, and outputs the control signals ""ct1"" and "ct2" as well as the data signal "da" for screen update to the display panel unit 10, based on the expanded image block data of the preceding screen and the expanded image block data of the corresponding updating screen.

In this case, the display/update controlling unit (module board 20) includes The display/update controlling unit includes the display circuit unit 21$a$, the data conversion circuit unit 21$b$, the graphic memory 22, the working region unit 23$a$, the data storage unit 24$a$, the radio transmit/receive unit 25, the power supply management unit 26, secondary battery 27, and the display power supply circuit 28. In image data update processing, the radio transmit/receive unit 25 receives sequentially a plurality of pieces of compressed image block data having a data configuration which one screen of the image data is divided into a plurality of blocks (reception processing). The data storage unit 24$a$ stores the image block data received by the radio transmit/receive unit 25 (data storage processing). The data conversion circuit unit 21$b$ expands the image block data pieces of a preceding screen and the image block data pieces of the corresponding updating screen (data conversion processing), and the graphic memory 22 stores the image block data expanded by the data conversion circuit unit 21$b$ (image block data storage processing). The display circuit unit 21$a$ provides the display panel unit 10 with the control signals ""ct1"" and "ct2" as well as the data signal "da" based on the image block data stored in the graphic memory 22 (signal output processing). Further, in the image block data storage processing, only some of the preceding screen data pieces and the updating screen data pieces will be stored in the graphic memory 22.

That is, as shown in FIG. 7, during the overall operations of the image display device, the image updating period of time R and the image holding period of time H are alternately repeated at a constant time interval. The operations are managed by the power supply management unit 26. The electrophoretic display element 17 of the electronic paper display section 11 has memory functions, so that none of the circuits involved in display need to operate during the image holding period of time H. Therefore, the display controller 21, the graphic memory 22, the display power supply circuit 28, and the working region unit 23$a$ (RAM 23) are in the power-off state. Further, the radio transmit/receive unit 25 is in the standby mode, waiting for communication of data from the server. The data storage unit 24$a$ is also in the power-off state or the standby mode (step A1).

If a signal which starts data transmission is received from the server by the radio transmit/receive unit 25, reception of the image data in starts, to turn on the power of the data storage unit 24$a$ also, thereby writing the image data (step A1$b$). In this case, the image data may be LUT data or an image block data group which has been compressed as divided into blocks that correspond to a single or a plurality of lines on a display screen of the electronic paper display section 11 and will be written to the data storage unit 24$a$. If the reception of the image data by the radio transmit/receive unit 25 ends, a shift is made to step A1. If an image update instruction from the server is received by the radio transmit/receive unit 25, the processing goes to the image updating period of time R.

With the image updating period of time R, the display controller 21, the graphic memory 22, the display power supply circuit 28, the RAM 23 (working region unit 23$a$), and the data storage unit 24$a$ enter the power-on state, waking up all the circuits in the module board 20. Next, the screen information data, the preceding screen data, the updating screen data (image block data), and the LUT data which are stored in the data storage unit 24$a$ are expanded into a working region (working region unit 23$a$) (step A2). Then, the screen information data containing the preceding screen information and the updating screen information is updated and written into a data storage region (data storage unit 24$a$) (step A3). In the step A3, after the image updating period of time R ends, the display controller 21 and a like inter in the power-off state, to save information of the preceding screen even if the data in the working region (working region unit 23$a$) or the graphic memory 22 is lost.

At step A4, one piece of the image block data is expanded and written into the graphic memory 22 so that the compressed data may be expanded. Next, the display circuit unit 21$a$ calculates driver data from the LUT and the screen information data read from the graphic memory 22 and outputs the data signal "da" (driver data) to the data driver 13. After the data signal "da" (driver data) is output from the display circuit unit 21$a$, if one screen is yet to be updated completely, the screen information data block is read, to repeat the calculation and output of the driver data (step A4). After a driving period of the operations is performed, power supply for display is turned off, returning to the image holding period of time H (step A1).

A memory size and dissipation power of the present image display device will be compared below to those in a case where conventional compression is not performed. It is assumed that one screen of data is divided into 10 image blocks and, as shown in FIG. 8, for example, compressed in the JPEG format at a compression ratio of 20% (⅕). Assuming the case of eight-bit monochromatic display on the UXGA type display panel unit, the working region will have a total memory size of 7 M bits=1600×1200×8×2×20% (=6 M bits) as two screens of the image data+1 M bits of LUT or a like. Further, the graphic memory 22 has a total memory size of 3 Mbits=1600×1200×8×(1/10)×2 buffers, so that the total sum may be about 10 M bits. On the other hand, in the case where the conventional compression is not performed, the total sum is about 31 M bits, so that the memory size is reduced to about one third (⅓). Since the memory dissipates about 10 mW for each 1M bits during the image updating (when the device is operating at 50-100 MHz), it is possible to reduce the dissipation power by about 200 mW for 20M bits.

In the present image display device as a whole, dissipation power of 300 mW at the time of image updating has been reduced to 300 mW. If power dissipated in the display controller 21 can be decreased more, memory contents will be reduced so that dissipation power may be reduced even more. Further, in a typical case where the working region memory and the graphic memory are built in the display controller 21, the process is not specialized to the memories, so that it is difficult to reduce dissipation power of the memory unit to 1 mW or less in the standby mode; in contrast to it, in the first exemplary embodiment, the screen information data is stored in a data storage region (data storage unit 24*a*) in the ROM2, so that the memory can be put into the power-off state when an image is being held. Accordingly, it is possible to easily build the memory into the display controller 21 without using specialized processes, thereby reducing the costs and the number of the components as well as the dissipation power during the time of image holding.

As has been described, in the first exemplary embodiment, data of an image to be displayed is divided into image blocks of data compressed in a proper block format and saved in a data storage region (data storage unit 24*a*) so that each of the image blocks may be expanded into the graphic memory 22, thereby enabling reduction of the capacity of this graphic memory 22. Further, in the present image display device, the memory can be put into the power-off state when an image is being held, so that it is possible to easily build the memory into the display controller 21 without using specialized processes, thereby reducing the costs and the number of the components as well as the dissipation power during the time of image holding.

Second Exemplary Embodiment

Figure 9:
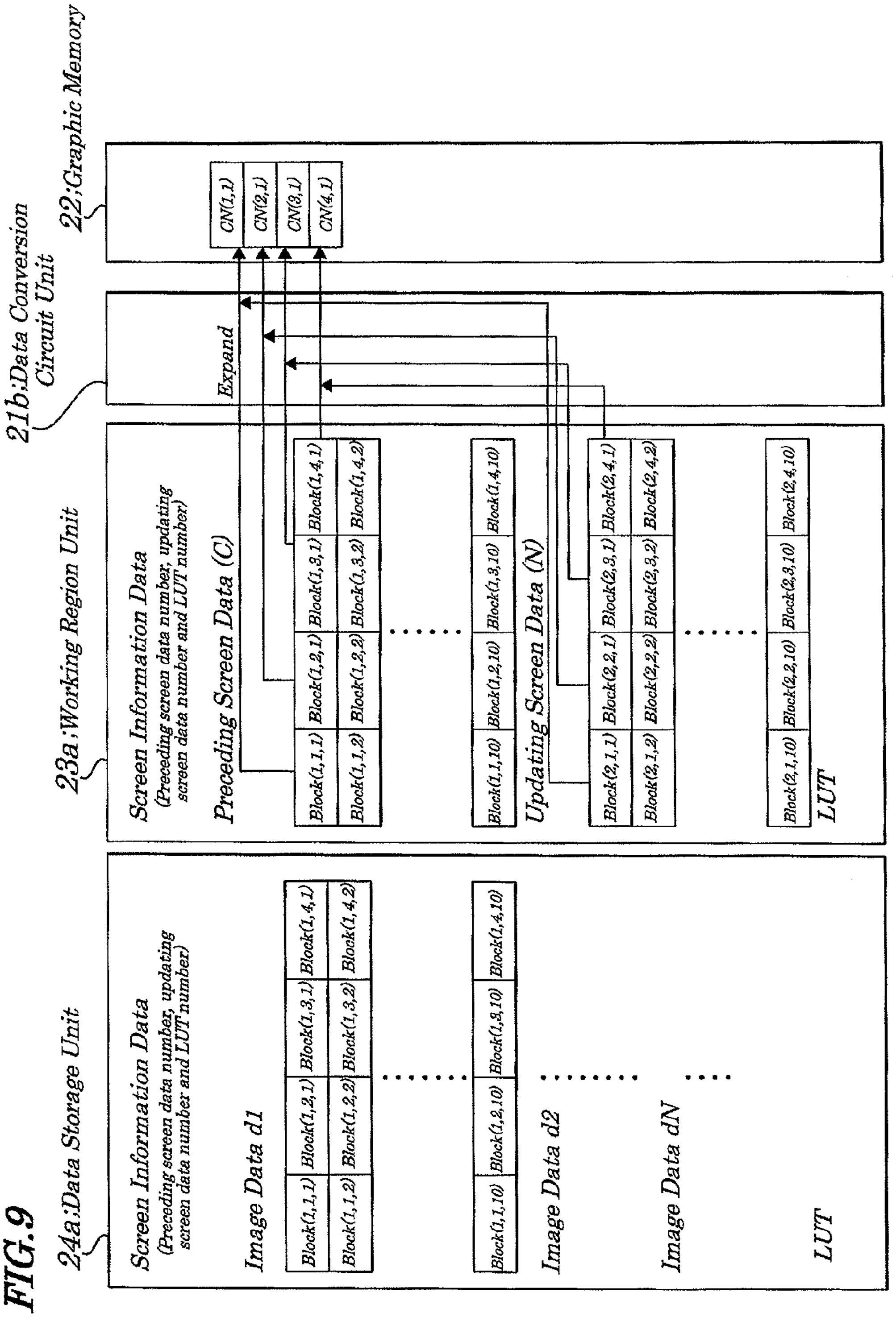
FIG. 9 is a schematic diagram for explaining a format and processing of data which is expanded into a data storage unit 24*a*, a working region unit 23*a*, a data conversion circuit unit 21*b*, and a graphic memory 22 in an image display device according to a second exemplary embodiment of the present invention.

FIG. 9 is a schematic diagram for explaining a format and processing of data which is expanded into a data storage unit 24*a*, a working region unit 23*a*, a data conversion circuit unit 21*b*, and a graphic memory 22 in an image display device according to the second exemplary embodiment of the present invention.

The image display device of the second exemplary embodiment is different from that of the first exemplary embodiment in a format of image data which is expanded into the data storage unit 24*a*, working region unit 23*a*, and graphic memory 22, in particular, in a method for dividing data of one screen into image block data pieces. That is, as shown in FIG. 9, the data pieces of an image to be displayed are stored in the data storage unit 24*a* in order in which they are to be displayed.

For example, the image data pieces are fitted with image numbers (d1, d2, . . . , and dN) in order in which they are to be displayed.

Further, one screen of image data is also compressed as divided into (k×l) number of blocks. For example, on a UXGA panel (m=1600, n=1200), the image data is divided into (4 by 10) blocks. In this case, those blocks each have a size of 400 by 120 pixels. Address information of those BLOCKs (h, k, l) (h=1, 2, . . . , and N) is stored as a table. It is to be noted that compressed data is created by dividing and compressing its original data on a personal computer (PC) at a server by using dedicated software. A format for compression used is, similar to the case of the first exemplary embodiment, a lossy compression format of JPEG, Wavelet, or fractal compression, which may be replaced with a lossless compression format of Huffman coding, run-length coding, LZW, or a like.

In the working region unit 23*a* are stored the screen information data, preceding image data, updating image data, and a LUT to be used which are transferred from the data storage unit 24*a*. In the graphic memory 22, when an image is going to be displayed on the electronic paper display section 11, a predetermined number of pieces of CN (k, l) are stored, which are C:N data expanded and calculated from the block data of a preceding screen and those of an updating screen. For example, in a case where the data is divided into unit blocks each of which includes 400 by 120 pixels for the panel array of 1600 by 1200 pixels, since the data is divided by four (4) along the line, the C:N data pieces of CN (1, 1), CN (2, 1), CN (3, 1), and CN (4, 1) are expanded so that the data along the line may all be read. This is because driver data (data signal "da") is output along the line and, therefore, the data along the line should preferably be expanded and read out in a collective manner.

Figure 10:
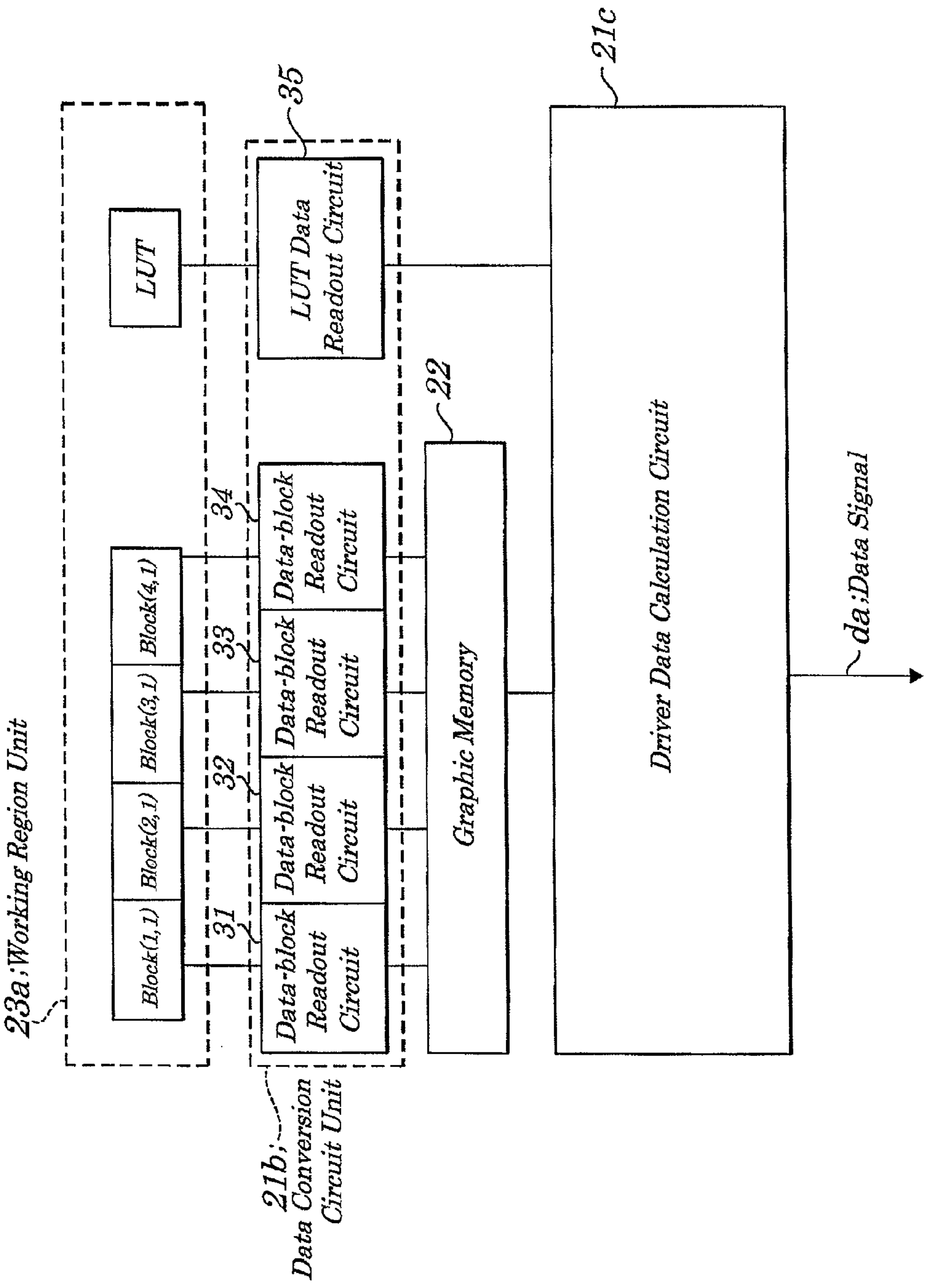
FIG. 10 is a diagram for explaining a method for reading and expanding screen information data blocks in the image display device.

FIG. 10 is a diagram for explaining a method for reading and expanding screen information data blocks in the image display device.

A description will be given of a driving method used in the image display device of the second exemplary embodiment with reference to FIG. 10.

The present image display device is different from that of the first exemplary embodiment in how to read and expand screen information data blocks with the image updating period of time R. That is, the data conversion circuit unit 21*b* reads image block data from the working region unit 23*a*, packs the data of a preceding image (high-order four bits of the eight bits) and the data of an updated image (high-order four bits of the eight bits) for each of the pixels and calculates them into C:N data, and expands it into the graphic memory 22.

The reading and expanding operations need to be performed in a black period of the line, so that it is necessary to concurrently perform a plurality of operations of expansion of the image blocks and calculation of the C: N data by use of the data conversion circuit unit 21*b*. For example, in a case where the data is divided into unit blocks each of which includes 400 by 120 pixels for the UXGA panel array of 1600 by 1200 pixels, since the data is divided by four (4) along the line, four data-block readout circuits 31, 32, 33, and 34 operate concurrently, to concurrently expand the C:N data pieces of CN(1, 1), CN(2, 1), CN(3, 1), and CN(4, 1) into the graphic memory 22. Then, almost the same processing as that in the first exemplary embodiment will be performed to output the driver data (data signal "da") by using a driver data calculation circuit 21*c* in a display circuit unit 21*a*.

As has been described, in the second exemplary embodiment, the four data-block readout circuits 31, 32, 33, and 34 in the data conversion circuit unit 21*b* operate concurrently, so that it has an advantage of a higher read speed than the first exemplary embodiment in addition to those of this first exemplary embodiment. Further, if the data-block readout circuits 31, 32, 33, and 34 are of a double buffer structure, when a preceding block is being written, it can also be read and expanded concurrently, giving an advantage of stable operations of the circuitry.

Third Exemplary Embodiment

Figure 11:
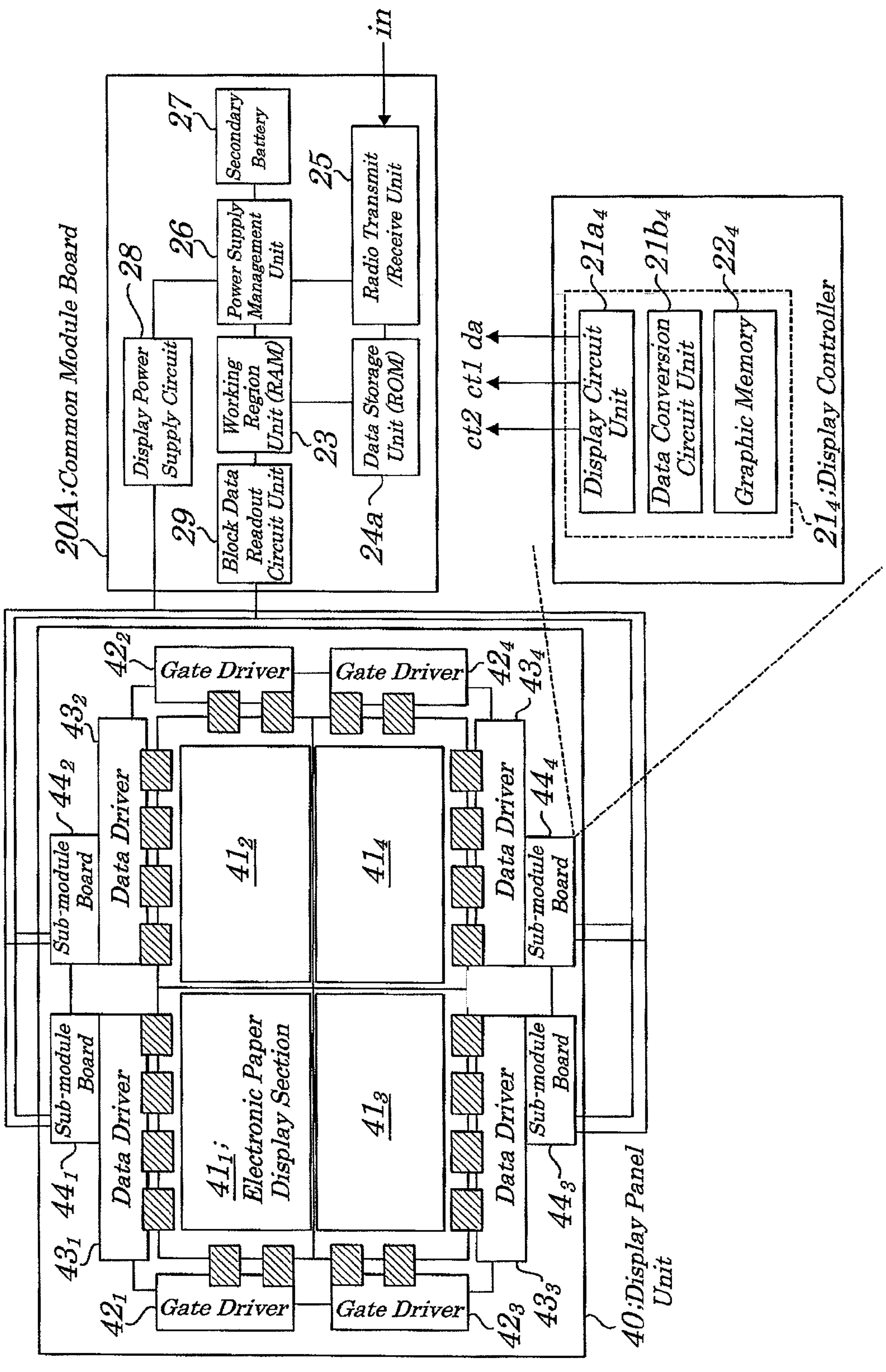
FIG. 11 is a block diagram for showing schematically electrical configurations of main portions of an image display device according to a third exemplary embodiment of the present invention.

FIG. 11 is a block diagram for showing schematically electrical configurations of main portions making up an image display device according to a third exemplary embodiment of the present invention.

As shown in this FIG. 11, in the image display device according to the third exemplary embodiment, the display panel unit 10 and the module board 20 in FIG. 1 have been replaced with a display panel unit 40 and a common module board 20A which are of a different configuration. The display panel unit 40 includes electronic paper display sections $41_1$, $41_2$, $41_3$, and $41_4$, gate drivers $42_1$, $42_2$, $42_3$, and $42_4$, data drivers $43_1$, $43_2$, $43_3$, and $43_4$, and sub-module boards $44_1$, $44_2$, $44_3$, and $44_4$. The electronic paper display sections $41_1$, $41_2$, $41_3$, and $41_4$ have almost the same configuration as the electronic paper display section 11 in FIG. 1 and are arranged in a matrix array with two rows and two columns so that they may display one screen in all.

The data drivers $43_1$, $43_2$, $43_3$, and $43_4$ are provided for each of the electronic paper display sections $41_1$, $41_2$, $41_3$, and $41_4$ and arranged to write pixel data pieces based on data signals da supplied thereto to data lines of the electronic paper display sections $41_1$, $41_2$, $41_3$, and $41_4$ based on a control signal "“ct1”" supplied thereto, respectively. The gate drivers $42_1$, $42_2$, $42_3$, and $42_4$ are provided for each of the electronic paper display sections $41_1$, $41_2$, $41_3$, and $41_4$ and arranged to output a scanning line drive signal for driving scanning lines of the electronic paper display sections $41_1$, $41_2$, $41_3$, and $41_4$ in predetermined order based on a control signal "ct2" supplied thereto, respectively.

In the common module board 20A, the display controller 21 and the graphic memory 22 in FIG. 1 have been replaced with a block data readout circuit unit 29. In a data storage unit 24*a*, a plurality of pieces of image data acquired from a server is stored as divided into such image block data pieces that the screen data of one screen may be compressed as divided into a plurality of blocks. It is to be noted that the image block data may be of a blocksize that corresponds to the electronic paper display sections $41_1$, $41_2$, $41_3$, and $41_4$, that is, compressed by dividing one screen into four subdivisions or more finely; however, this data must be divided in such a manner that a plurality of the blocks may make up one display screen. For example, in the case of having the electronic paper display sections $41_1$, $41_2$, $41_3$, and $41_4$ as in a case of the present image display device, the blocks could be configured by dividing one screen into four (=2×2), eight (=2×4), 16 (=4×4), or 32 (=4×8) subdivisions but not into nine (=3×3) subdivisions. That is, in the case of a multi-display system including a plurality of displays arranged in a form of a matrix array with m rows and n columns, it is preferable that a plurality of pieces of image block data is arranged in a form of an array with aM×bN ("a" and "b" each are an integer.). The reason is that if the screen is not divided as described above, block data that stretches over a plurality of displays will occur, making it difficult to efficiently transmit the data to the sub-module boards $44_1$, $44_2$, $44_3$, and $44_4$.

The block data readout circuit unit 29 reads image block data from the data storage unit 24*a* and transmits it to the sub-module boards $44_1$, $44_2$, $44_3$, and $44_4$. In this case, the image block data is fitted with a header (for example, display ID) that denotes one of the electronic paper display sections on which to display an image that corresponds to this image block data. The sub-module boards $44_1$, $44_2$, $44_3$, and $44_4$ each have a display controller. For example, the sub-module board $44_4$ is equipped with a display controller $21_4$. The display controller $21_4$ is made up of a display circuit unit $21a_4$, a data conversion circuit unit $21b_4$, and a graphic memory $22_4$, which have almost the same functions as the display circuit unit 21*a*, the data conversion circuit unit 21*b*, and the graphic memory $22_4$ respectively in FIG. 1. Further, the sub-module board $44_1$, $44_2$, and $44_3$ are also equipped with display controllers $21_1$, $21_2$, and $21_3$ respectively which are not shown and have almost the same configuration as the display controller $21_4$.

Figure 12:
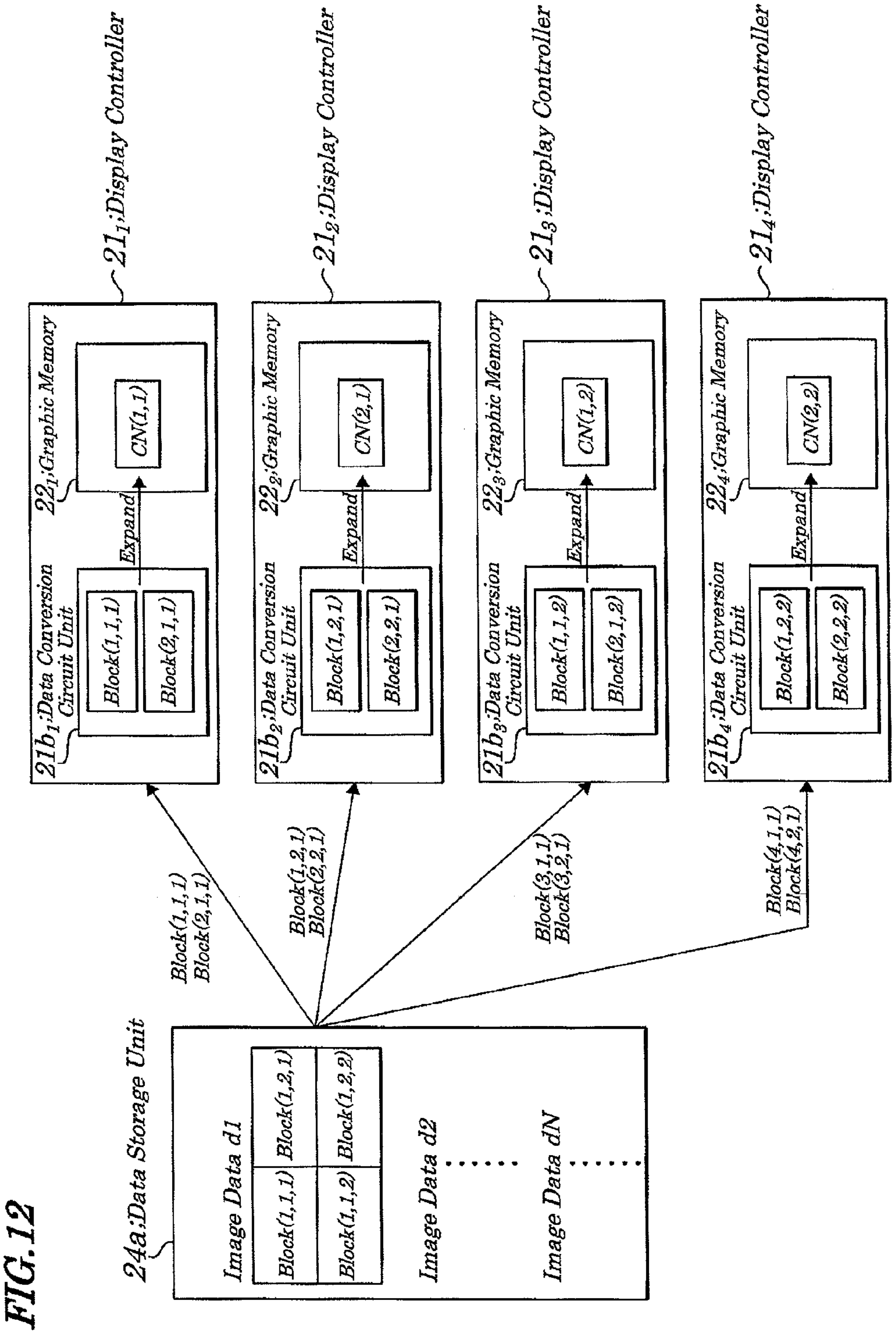
FIG. 12 is a diagram for explaining a format and processing of data which is expanded into a data storage unit 24*a* and display controllers $\mathbf{21}_4$, $\mathbf{21}_1$, $\mathbf{21}_2$, and $\mathbf{21}_3$ shown in FIG. 11.

FIG. 12 is a diagram for explaining a format and processing of data which is expanded into the data storage unit 24*a* and the display controllers $21_1$, $21_2$, $21_3$, and $21_4$ in FIG. 11.

In the data storage unit 24*a*, image data pieces to be displayed are stored in a predetermined format in order in which they are to be displayed. That is, in the data storage unit 24*a*, as shown in this FIG. 12, image data pieces are fitted with image numbers. (image data pieces d1, d2, . . . , and dN) in order in which they are to be displayed. Each of the image data pieces is compressed as divided into blocks. If the image display device includes (M×N) pieces of electronic paper display sections, the data must be divided into (aM×bN) pieces of image blocks. The image block data pieces are fitted with headers that denote the electronic paper display sections $41_1$, $41_2$, $41_3$, and $41_4$ so that the display controllers $21_1$, $21_2$, $21_3$, and $21_4$ in the respective sub-module boards $44_1$, $44_2$, $44_3$, and $44_4$ may analyze the headers, to decide whether the data should be displayed. Since the present image display device is made up of four (=2×2) pieces of display devices, the data storage unit 24*a* stores a block data BLOCK (h, k, l) (h=1, 2, and N: the number of pixel data pieces, k=1, 2, l=1, 2) as divided into four (2×2) subdivisions. It is to be noted that although the image block data should preferably be stored with data compression, it may be stored without data compression if the data storage unit 24*a* has a sufficient storage size.

The image block data in the data storage unit 24*a* is read by the block data readout circuit unit 29 so that, in accordance with screen information data, the block data BLOCK (1, 1, 1) of a preceding screen and the block data BLOCK (2, 1, 1) of an updating screen may be transmitted to the display controller $21_1$ of the sub-module board $44_1$. Similarly, the block data BLOCK (1, 2, 1) of the preceding screen and the block data BLOCK (2, 2, 1) of the updating screen may be transmitted to the display controller $21_2$ of the sub-module board $44_2$, the block data BLOCK (1, 1, 2) of the preceding screen and the block data BLOCK (2, 1, 2) of the updating screen may be transmitted to the display controller $21_3$ of the sub-module board $44_3$, and the block data BLOCK (1, 2, 2) of the preceding screen and the block data BLOCK (2, 2, 2) of the updating screen may be transmitted to the display controller $21_4$ of the sub-module board $44_4$, respectively. Then, the data conversion circuit units $21b_1$, $21b_2$, $21b_3$, and $21b_4$ in the display controllers $21_1$, $21_2$, $21_3$, and $21_4$ stores C: N data CN (i, j) calculated from the block data pieces as expanded into the graphic memories $22_1$, $22_2$, $22_3$, and $22_4$, respectively.

Figure 13:
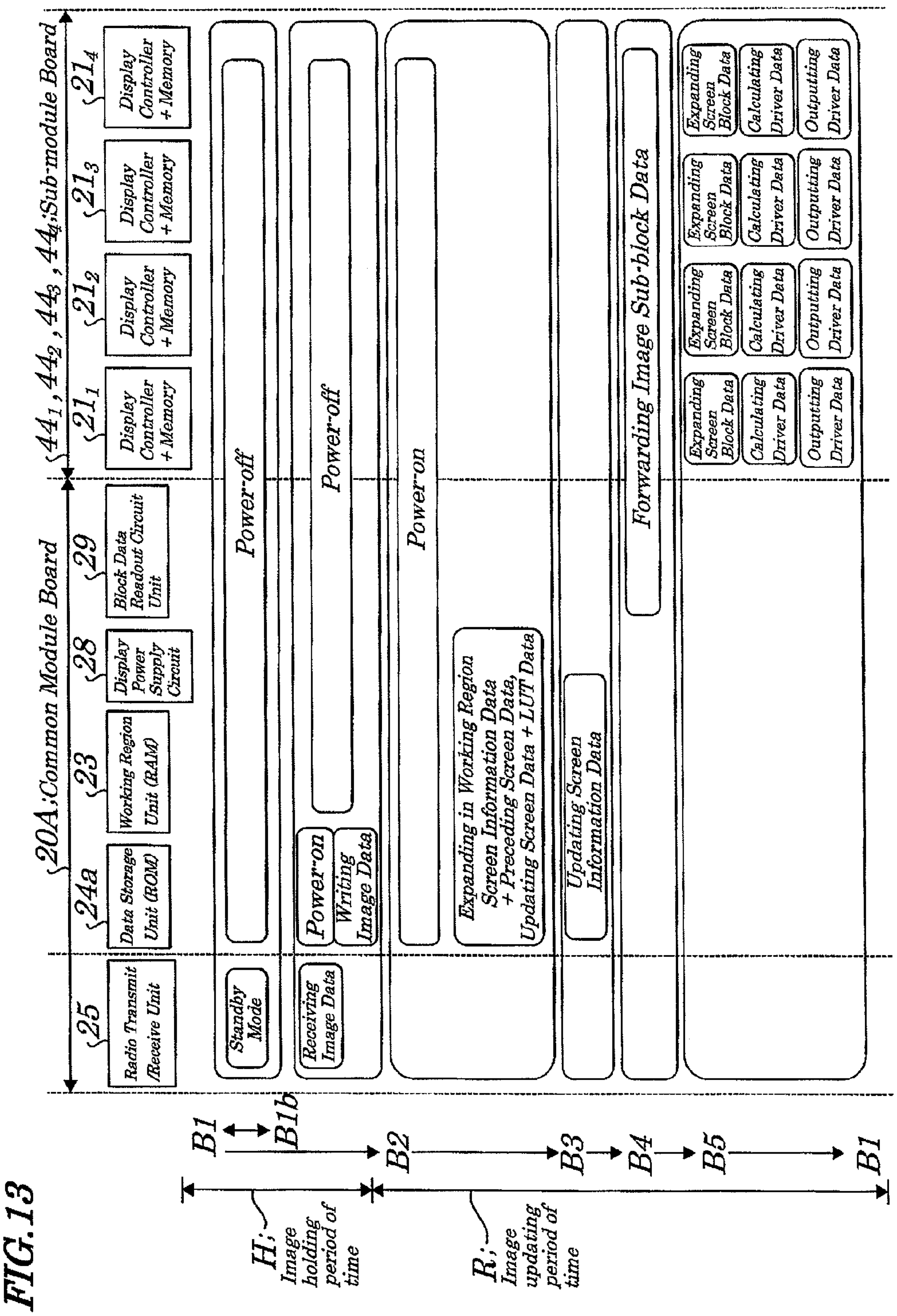
FIG. 13 is a sequence chart for explaining operations of the image display device shown in FIG. 11.

FIG. 13 is a sequence chart for explaining operations of the image display device in FIG. 11.

A description will be given of processing contents of a driving method used in the image display device of the third exemplary embodiment with reference to FIGS. 11 and 13.

In the image display device, the common module board 20A is used to store such image block data so that the image data in of one screen may be compressed as divided into a plurality of blocks. Further, for each electronic paper display section $41_1$, $41_2$, $41_3$, and $41_4$ is provided a display/update controlling unit. The display/update controlling unit store in expanded condition the image block data pieces of a preceding screen and the image block data pieces of the corresponding updating screen out of the image block data stored in the common module board 20A and output the control signal "ct2" to the respective gate drivers $42_1$, $42_2$, $42_3$, and $42_4$ and the control signal "“ct1”" as well as the data signal "da" to the respective data drivers $43_1$, $43_2$, $43_3$, and $43_4$ based on the stored image block data pieces (image data update processing).

In this case, the common module board 20A is equipped with the radio transmit/receive unit 25 and the data storage unit 24*a*, so that this radio transmit/receive unit 25 receives such image block data that the image data in of one screen may be compressed as divided into a plurality of blocks (reception processing) and the data storage unit 24*a* stores the image block data received by the radio transmit/receive unit 25 (data storage processing). Further, each display/update controlling unit includes the data conversion circuit units $21b_1$, $21b_2$, $21b_3$, and $21b_4$, the graphic memories $22_1$, $22_2$, $22_3$, and $22_4$, and display circuit units $21a_1$, $21a_2$, $21a_3$, and $21a_4$, so that those data conversion circuit units $21b_1$, $21b_2$, $21b_3$, and $21b_4$ expand the image block data of a preceding screen and that of the corresponding updating screen (data conversion processing).

The graphic memories $22_1$, $22_2$, $22_3$, and $22_4$ store the image block data expanded by the data conversion circuit units $21b_1$, $21b_2$, $21b_3$, and $21b_4$ (image block data storage processing) so that based on the image block data stored in the graphic memories $22_1$, $22_2$, $22_3$, and $22_4$, the control signals ""ct1"" and "ct2" as well as the data signal "da" may be output (signal output processing). In the image block data storage processing, only some of the preceding screen data pieces and the updating screen data pieces will be stored by the graphic memories $22_1$, $22_2$, $22_3$, and $22_4$.

That is, as shown in FIG. 13, during the overall operations of the image display device, an image updating period of time R and an image holding period of time H are alternately repeated at a constant time interval. The operations are managed by a power supply management unit 26. An electrophoretic display element 17 of each of the electronic paper display sections $41_1$, $41_2$, $41_3$, and $41_4$ has memory functions, so that none of the circuits involved in display needs to operate during the image holding period of time H. Therefore, a display power supply circuit 28, the working region unit 23*a*, and the block data readout circuit unit 29 on the common module board 20A are in the power-off state. Further, the display controllers $21_1$, $21_2$, $21_3$, and $21_4$ on the respective sub-module boards $44_1$, $44_2$, $44_3$, and $44_4$ are also in the power-off state. Additionally, the radio transmit/receive unit 25 is in the standby mode, waiting for communication of data from the server. The data storage unit 24*a* is also in the power-off state or the standby mode (step B1).

If a signal which starts data transmission is received from the server by the radio transmit/receive unit 25, reception of the image data in starts, to turn on the power of the data storage unit 24*a* also, thereby writing the image data in (step B1*b*). In this case, the image data in may be LUT data, screen information data, or an image block data group which has been compressed as divided into blocks that correspond to a single or a plurality of lines on a display screen of the electronic paper display sections $41_1$, $41_2$, $41_3$, and $41_4$ and will be written to the data storage unit 24*a*. If the reception of the image data in by the radio transmit/receive unit 25 ends, a shift is made to step B1. If an image update instruction from the server is received by the radio transmit/receive unit 25, the processing goes to the image updating period of time R.

With the image updating period of time R, the entire circuitry on the common module board 20A as well as the display controllers $21_1$, $21_2$, $21_3$, and $21_4$ wake up. Next, the screen information data, the preceding screen data, the updating screen data (image block data), and the LUT data which are stored in the data storage unit 24*a* are expanded into a working region (working region unit 23*a*) (step B2). Then, the screen information data containing the preceding screen information and the updating screen information is updated and written into a data storage region (data storage unit 24*a*) (step B3). In the step B3, after the image updating period of time R ends, the display controllers $21_1$, $21_2$, $21_3$, and $21_4$, and alike inter the power-off state, to save information of the preceding screen even if the data in the graphic memories $22_1$, $22_2$, $22_3$, and $22_4$ or the working region (working region unit 23*a*) is lost.

Then, the block data group and the LUT are transferred by the block data readout circuit unit 29 to the sub-module boards $44_1$, $44_2$, $44_3$, and $44_4$. The image block data pieces are fitted with headers that denote the electronic paper display sections so that the display controllers $21_1$, $21_2$, $21_3$, and $21_4$ in the respective sub-module boards $44_1$, $44_2$, $44_3$, and $44_4$ may analyze those headers, to decide whether the data is directed to the relevant electronic paper display section panel unit; if decided to be directed to this electronic paper display section panel unit, this image block data is written to the data conversion circuit unit in the display controller on the relevant sub-module board (step B4). In the display controllers $21_1$, $21_2$, $21_3$, and $21_4$ on the sub-module boards $44_1$, $44_2$, $44_3$, and $44_4$, the block data pieces in the data conversion circuit units $21b_1$, $21b_2$, $21b_3$, and $21b_4$ are expanded and written to the graphic memories $22_1$, $22_2$, $22_3$, and $22_4$, respectively.

Next, in the display controllers $21_1$, $21_2$, $21_3$, and $21_4$, based on the data pieces in the graphic memories $22_1$, $22_2$, $22_3$, and $22_4$, driver data pieces (data signals da) are calculated by the display circuit units $21a_1$, $21a_2$, $21a_3$, and $21a_4$ and output to the data drivers $43_1$, $43_2$, $43_3$, and $43_4$, respectively. After those driver data pieces (data signals da) are output, if one screen is yet to be updated completely, the operations will be repeated to expand the screen block data and calculate and output the driver data (step B5). After a driving period of the operations is performed, power supply for display is turned off, returning to step B1 the image holding period of time H (step B1).

As has been described, in the present third exemplary embodiment, image data in stored in the data storage unit 24*a* is compressed as divided into blocks that correspond to the respective electronic paper display sections $41_1$, $41_2$, $41_3$, and $41_4$, while the image block data transferred from the common module 20A is expanded into the graphic memories $22_1$, $22_2$, $22_3$, and $22_4$ on the respective sub-module boards $44_1$, $44_2$, $44_3$, and $44_4$ so that it may be displayed; therefore, the blocks of the image data in stored in the data storage unit 24*a* beforehand are arranged in an array with aM number of rows and bN number of columns (a, b:integer) that corresponds to a multi-display system having an array with M number of rows and N number of columns so that they may be delivered to those displays. Further, the radio transmit/receive unit 25 and the data storage unit 24*a* which stores image data to be displayed need only to be provided each for a plurality of the displays on the common module board 20A, thereby simplifying the hardware configuration and reducing dissipation power. Further, the image data pieces stored in the data storage unit 24*a* are compressed as divided into four subdivisions corresponding to the four screens of the electronic paper display sections $41_1$, $41_2$, $41_3$, and $41_4$ and each fitted with a display ID as a header, so that when those image data pieces are delivered to the sub-module boards $44_1$, $44_2$, $44_3$, and $44_4$, the display controller on those sub-module boards analyze those headers to decide whether the data pieces are to be displayed, thereby realizing a relatively simple hardware configuration for the present image display device.

While the invention has been particularly shown and described with reference to exemplary embodiments thereof, the invention is not limited to these exemplary embodiments. For example, the working region unit 23*a* and the graphic memory 22 in FIG. 1 may also be configured in the same memory. Further, although the data storage unit 24*a* and the working region unit 23*a* have been made of the mutually different components of the ROM 24 and the RAM 23 respectively, they may be the same component, for example, a mobile RAM with a data holding mode, which will hold data on ultra-low dissipation power of a few tens of microwatts without clock signals. Further, if the working region requires only a small memory capacity because the compression ratio of the image data in is high, the working region memory may be contained in the display controller 21.

Further, image data may be stored in the data storage unit 24*a* in FIG. 1 in such a manner that a data difference between a preceding image and the next one may be compressed as divided into blocks. In contrast to the first and second exemplary embodiments in which images have been displayed in predetermined order, for example, sequentially from the first one and then the second one, by storing, for example, the first and 10-th images themselves as compressed and divided into multiple blocks, image display can be skipped to the 10-th image block. Further, data itself converted into frame-specific driver data (data signal) by LUT conversion can be stored in the data storage unit 24*a* as compressed and divided into blocks. In this case, if a storage of the data storage unit 24*a* has a high reading speed, the image information storage means is unnecessary, and if the speed is low, a ROM or RAM having a high reading speed may be used as a device of the image information storage means so that data may be transferred only at the time of image updating. By employing such an arrangement, data prior to image display can be calculated easily, simplifying the configuration of the display circuit unit 21*a*.

Further, in the third exemplary embodiment, the number of the electronic paper display sections in FIG. 1 is not limited to four as long as they are configured as a multi-display with a matrix array for displaying one screen in all. Additionally, the secondary battery 27 in FIGS. 1 and 11 may be a solar battery.

PROBABILITY OF UTILIZED INDUSTRIALIZATION

The present invention can be applied in almost all content display devices such as an electronic bulletin board and an electronic advertizing system which operate on low dissipation power using a secondary battery or a solar battery as their power supply.

What is claimed is:

1. An image display device having a memory property comprising:

a display section having a plurality of data lines extending in parallel to one another along a first direction, a plurality of scanning lines extending in parallel to one another along a second direction, and a plurality of pixels which are each positioned at an intersection of each of said data lines and each of said scanning lines, said pixels each comprising an electrophoretic display element having a memory property;

a data line driving circuit that writes pixel data to each of said data lines based on a given first control signal and a given data signal;

a scanning line driving circuit that outputs a scanning line driving signal for driving said scanning lines in predetermined order, based on a given second control signal; and a display/update controlling unit to output said first control signal and said data signal to said data line driving circuit, and said second control signal to said scanning line driving circuit, based on given image data, during an image updating period of time, and to cut off power supply to said data line driving circuit and said scanning line driving circuit, during an image holding period of time, wherein said display/update controlling unit, during said image updating period of time, performs a series of processes of inputting compressed image block data having a data configuration which one screen of said image data is divided into a plurality of blocks equivalent to a plurality of divided screens, and compressed for each block, expanding said compressed image block data of a preceding screen and said compressed image block data of a corresponding updating screen inputted, and outputting said data signal for screen update to said data line driving circuit, based on the expanded image block data of said preceding screen and the expanded image block data of said corresponding updating screen, the series of processes being repeated for every block.

2. The image display device having a memory property according to claim 1, wherein said display/update controlling unit comprises:

a receiving unit to receive sequentially said plurality of pieces of said compressed image block data; a data storage unit to store the sequentially received compressed image block data;

a data conversion circuit unit to expand said compressed image block data of said preceding screen and said compressed image block data of said corresponding updating screen sequentially received;

a graphic memory to store the expanded image block data of said preceding screen and the expanded image block data of said corresponding updating screen; and a display circuit unit to output said data signal for screen update to said data line driving circuit, based on the expanded image block data of said preceding screen and the expanded image block data of said corresponding updating screen.

3. The image display device having a memory property according to claim 2, wherein said graphic memory has a capacity size capable of storing a single piece of said expanded image block data of said preceding screen and a single piece of said expanded image block data of said corresponding updating screen, wherein the capacity size is incapable of storing expanded image data of one preceding screen and expanded image data of one updating screen.

4. An image display device having a memory property comprising:

a plurality of uni-display sections having a form of one screen of a multi-display as a whole, and each having a plurality of data lines extending in parallel to one another along a first direction, a plurality of scanning lines extending in parallel to one another along a second direction, and a plurality of pixels which are each positioned at an intersection of each of said data lines and each of said scanning lines, said pixels each comprising an electrophoretic display element having a memory property;

a plurality of data line driving circuits, provided for each uni-display section, that each write pixel data to each of said data lines based on a given first control signal and a given data signal;

a plurality of scanning line driving circuits, provided for each uni-display section, that each output a scanning line driving signal for driving said scanning lines in predetermined order, based on a given second control signal; and a display/update controlling unit to output said first control signal and said data signal to said data line driving circuits, and said second control signal to said scanning line driving circuits, based on given image data, during an image updating period of time, and to cut off power supply to said data line driving circuits and said scanning line driving circuits, during an image holding period of time, wherein said display/update controlling unit, during said image updating period of time, performs a series of processes of inputting compressed image block data having a data configuration which one screen of said image data for said multi-display is divided into a plurality of blocks equivalent to a plurality of divided screens, and compressed for each block, expanding said compressed image block data of a preceding screen and said compressed image block data of a corresponding updating screen inputted, and outputting said data signal for screen update to the corresponding data line driving circuit, based on the expanded image block data of said preceding screen and the expanded image block data of said corresponding updating screen, the series of processes being performed for every block.

5. The image display device having a memory property according to claim 4, wherein said display/update controlling unit comprises:

a receiving unit to receive sequentially said plurality of pieces of said compressed image block data;

a data storage unit to store the sequentially received compressed image block data;

a data conversion circuit unit to expand said compressed image block data of said preceding screen and said compressed image block data of said corresponding updating screen sequentially received;

a graphic memory to store the expanded image block data of said preceding screen and the expanded image block data of said corresponding updating screen; and a display circuit unit to output said data signal for screen update to said data line driving circuit, based on the expanded image block data of said preceding screen and the expanded image block data of said corresponding updating screen.

6. The image display device having a memory property according to claim 5, wherein said data conversion circuit unit, said graphic memory, and said display circuit unit are provided for each uni-display section.

7. The image display device having a memory property according to claim 5, wherein said graphic memory has a capacity size capable of storing a single piece of said expanded image block data of said preceding screen and a single piece of said expanded image block data of said corresponding updating screen on the corresponding uni-display section, wherein the capacity size is incapable of storing expanded image data of one preceding screen and expanded image data of one updating screen on the corresponding uni-display section.

8. The image display device having a memory property according to claim 4, wherein said uni-display sections are arranged in such a manner to have a form of a matrix array with M rows and N columns; and "said compressed/expanded image block data is made up of aM".times."bN" pieces of blocks as one screen of image data for said multi-display, where "M" and "N" each are an integer, at least one of which is an integer of two or more, and where "a" and "b" each are an integer, at least one of which is an integer of two or more.

9. The image display device having a memory property according to claim 4, wherein a header for designating a target display sections is attached to said expanded image block data; and wherein said display/update controlling unit outputs said first control signal and said data signal to the corresponding data line driving circuit, and said second control signal to the corresponding scanning line driving circuit, based on the attached header.

10. A driving method for driving an image display device having a memory property, the image display device comprising: a display section having a plurality of data lines extending in parallel to one another along a first direction, a plurality of scanning lines extending in parallel to one another along a second direction, and a plurality of pixels which are each positioned at an intersection of each of said data lines and each of said scanning lines, said pixels each comprising an electrophoretic display element having a memory property; a data line driving circuit that writes pixel data to each of said data lines based on a given first control signal and a given data signal; a scanning line driving circuit that outputs a scanning line driving signal for driving said scanning lines in predetermined order, based on a given second control signal; and a display/update controlling unit to output said first control signal and said data signal to said data line driving circuit, and said second control signal to said scanning line driving circuit, based on given image data, during an image updating period of time, and to cut off power supply to said data line driving circuit and said scanning line driving circuit, during an image holding period of time, the driving method comprising:

a display/update processing in which said display/update controlling unit, during said image updating period of time, performs a series of processes of inputting compressed image block data having a data configuration which one screen of said image data is divided into a plurality of blocks equivalent to a plurality of divided screens, and compressed for each block, expanding said compressed image block data of a preceding screen and said compressed image block data of a corresponding updating screen inputted, and outputting said data signal for screen update to said data line driving circuit, based on the expanded image block data of said preceding screen and the expanded image block data of said corresponding updating screen, the series of processes being repeated for every block.

11. The driving method according to claim 10, wherein said display/update processing comprises:

a receiving processing to receive sequentially said plurality of pieces of said compressed image block data;

a compressed data storing processing to store the sequentially received compressed image block data in a data storage unit;

a data conversion processing to expand said compressed image block data of said preceding screen and said compressed image block data of said corresponding updating screen sequentially received;

a expanded data storing processing to store the expanded image block data of said preceding screen and the expanded image block data of said corresponding updating screen in a graphic memory; and a signal output processing to output said data signal for screen update to said data line driving circuit, based on the expanded image block data of said preceding screen and the expanded image block data of said corresponding updating screen.

12. The driving method according to claim 11, wherein said graphic memory has a capacity size capable of storing a single piece of said expanded image block data of said preceding screen and a single piece of said expanded image block data of said corresponding updating screen, wherein the capacity size is incapable of storing expanded image data of one preceding screen and expanded image data of one updating screen.

13. A driving method for driving an image display device having a memory property, wherein the image display device comprising:

a plurality of uni-display sections having a form of one screen of a multi-display as a whole, and each having a plurality of data lines extending in parallel to one another along a first direction, a plurality of scanning lines extending in parallel to one another along a second direction, and a plurality of pixels which are each positioned at an intersection of each of said data lines and each of said scanning lines, said pixels each comprising an electrophoretic display element having a memory property; a plurality of data line driving circuits, provided for each uni-display section, that each write pixel data to each of said data lines based on a given first control signal and a given data signal; a plurality of scanning line driving circuits, provided for each uni-display section, that each output a scanning line driving signal for driving said scanning lines in predetermined order, based on a given second control signal; and a display/update controlling unit to output said first control signal and said data signal to said data line driving circuits, and said second control signal to said scanning line driving circuits, based on given image data, during an image updating period of time, and to cut off power supply to said data line driving circuits and said scanning line driving circuits, during an image holding period of time, the driving method comprising:

a display/update processing in which said display/update controlling unit, during said image updating period of time, performs a series of processes of inputting compressed image block data having a data configuration which one screen of said image data for said multi-display is divided into a plurality of blocks equivalent to a plurality of divided screens, and compressed for each block, expanding said compressed image block data of a preceding screen and said compressed image block data of a corresponding updating screen inputted, and outputting said data signal for screen update to the corresponding data line driving circuit, based on the expanded image block data of said preceding screen and the expanded image block data of said corresponding updating screen, the series of processes being performed for every block.

14. The driving method according to claim 13, display/update processing comprises:

a receiving processing to receive sequentially said plurality of pieces of said compressed image block data;

a compressed data storing processing to store the sequentially received compressed image block data in a data storage unit;

a data conversion processing to expand said compressed image block data of said preceding screen and said compressed image block data of said corresponding updating screen sequentially received;

a expanded data storing processing to store the expanded image block data of said preceding screen and the expanded image block data of said corresponding updating screen in a graphic memory; and a signal output processing to output said data signal for screen update to said data line driving circuit, based on the expanded image block data of said preceding screen and the expanded image block data of said corresponding updating screen.

15. The driving method according to claim 14, wherein said data conversion processing, said expanded data storing processing, and said signal output processing are performed for each uni-display section.

16. The driving method according to claim 14, wherein said graphic memory has a capacity size capable of storing a single piece of said expanded image block data of said preceding screen and a single piece of said expanded image block data of said corresponding updating screen on the corresponding uni-display section, wherein the capacity size is incapable of storing expanded image data of one preceding screen and expanded image data of one updating screen.

* * * * *